(12) United States Patent
Yuan et al.

(10) Patent No.: US 11,190,260 B2
(45) Date of Patent: Nov. 30, 2021

(54) BEAM ESTIMATION AIDED BEAM ACQUISITION

(71) Applicant: Apple Inc., Cupertino, CA (US)

(72) Inventors: Fang Yuan, Beijing (CN); Xu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/644,635

(22) PCT Filed: Sep. 19, 2017

(86) PCT No.: PCT/CN2017/102307
§ 371 (c)(1),
(2) Date: Mar. 5, 2020

(87) PCT Pub. No.: WO2019/056182
PCT Pub. Date: Mar. 28, 2019

(65) Prior Publication Data
US 2021/0067224 A1   Mar. 4, 2021

(51) Int. Cl.
*H04B 7/06* (2006.01)
*H04W 72/08* (2009.01)

(52) U.S. Cl.
CPC ......... *H04B 7/0639* (2013.01); *H04B 7/0632* (2013.01); *H04B 7/0665* (2013.01); *H04W 72/085* (2013.01)

(58) Field of Classification Search
CPC .. H04B 7/0617; H04B 7/0639; H04B 7/0695; H04B 7/088; H04B 7/0632; H04B 7/0408; H04B 17/309; H04L 5/0048; H04L 25/03898; H04L 27/2633; H04W 16/28; H04W 72/042; H04W 72/1284; H04W 72/085
See application file for complete search history.

(56) References Cited

U.S. PATENT DOCUMENTS

| | | |
|---|---|---|
| 2011/0151923 A1 | 6/2011 | Mesecher |
| 2014/0044044 A1 | 2/2014 | Josiam et al. |
| 2015/0049824 A1 | 2/2015 | Kim et al. |
| 2016/0028519 A1 | 1/2016 | Wei |
| 2016/0134352 A1 | 5/2016 | Stirling-Gallacher |
| 2018/0367203 A1* | 12/2018 | Nilsson ................ H04B 7/0695 |

FOREIGN PATENT DOCUMENTS

WO  WO 2018/141216 A1   8/2018

OTHER PUBLICATIONS

Extended European Search Report for EP 17925814.0-1216 dated Mar. 5, 2021, 12 pages.

* cited by examiner

*Primary Examiner* — Rahel Guarino
(74) *Attorney, Agent, or Firm* — Kowert, Hood, Munyon, Rankin & Goetzel, P.C.

(57) ABSTRACT

Herein is disclosed a beam estimation system comprising one or more transceivers, configured to transmit a plurality of first-stage reference beams, and to receive a first quality identifier corresponding to a first first-stage reference beam with a strongest signal strength and a second quality identifier corresponding to a second first-stage reference beam with a second strongest signal strength; and one or more processors, configured to determine a second-stage reference beam region based on the first quality identifier and the second quality identifier.

20 Claims, 24 Drawing Sheets

BEAM ESTIMATION AIDED BEAM ACQUISITION

TECHNICAL FIELD

Embodiments described herein generally relate to beam acquisition in a wireless communications system.

BACKGROUND

Massive Multiple Input Multiple Output ("MIMO") systems may deploy several antennas at the base station, the user device, or both. The hybrid structure of the antenna array is used to provide high analog beamforming gain by phase-shifters while reducing the hardware cost. To enable high analog beamforming gain, the beam information needs to be acquired very accurately at the transmitter.

Conventionally, beam acquisition is achieved using beam sweeping over a grid-of-beams. However, conventional beam sweeping tends to perform no better than a conventional beam scanner, and conventional beam sweeping is limited by beam resolution and the impact of sidelobe.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the Disclosure. In the following description, various aspects are described with reference to the following drawings, in which.

DETAILED DESCRIPTION

Figure 1:
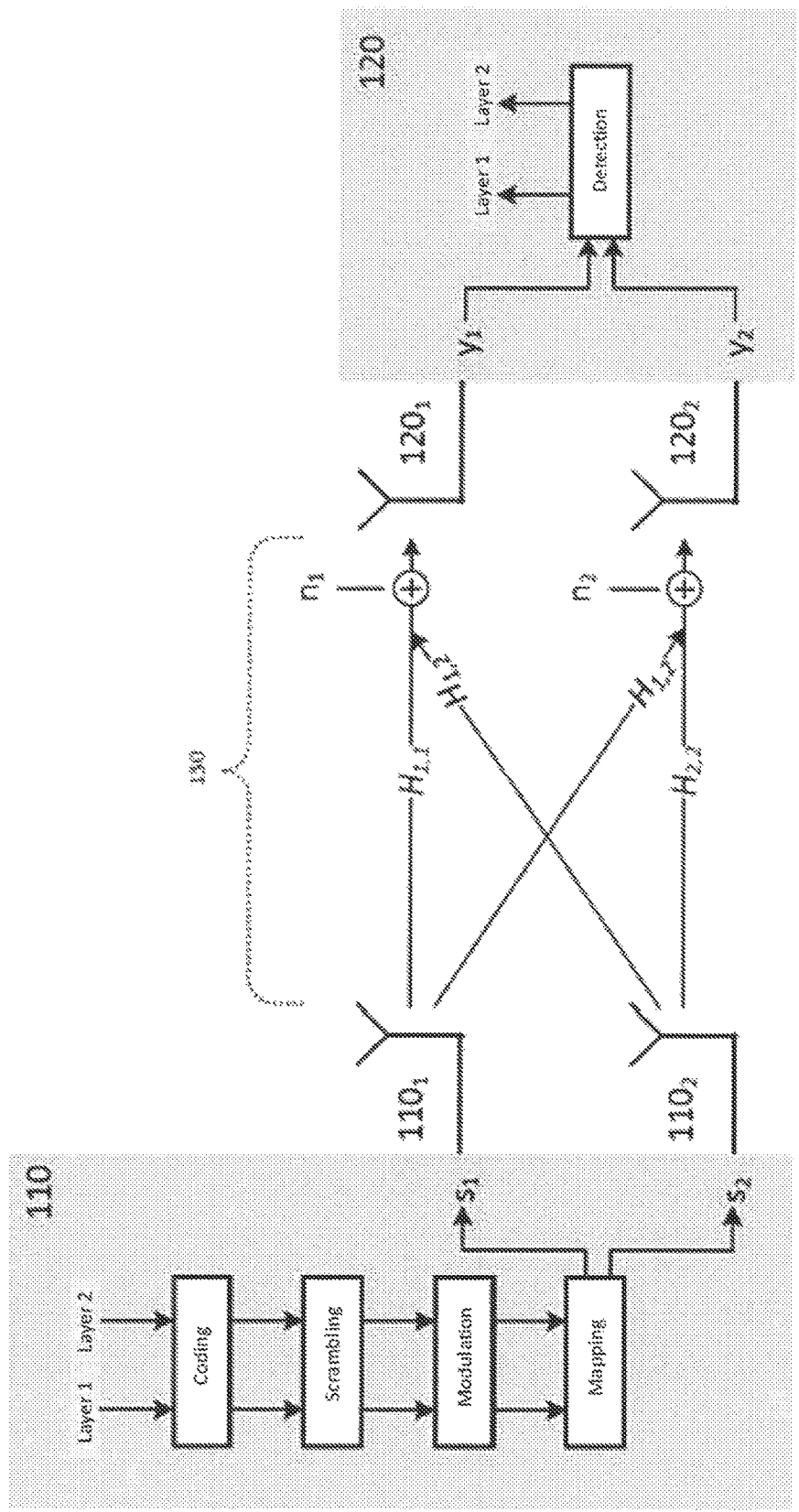
FIG. 1 shows an overview of a MIMO system.

The following detailed description refers to the accompanying drawings that show, by way of illustration, specific details and aspects in which the Disclosure may be practiced.

The word "exemplary" is used herein to mean "serving as an example, instance, or illustration." Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers to more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB ("eNB"), Home eNodeB, Remote Radio Head ("RRH"), relay point, etc., and may include base stations implemented with conventional base station architectures (e.g. distributed, "all-in-one", etc.) and base stations implemented with centralized base stations architectures (e.g. Cloud Radio Access Network ("Cloud-RAN") or Virtual RAN ("Vran")). As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access ("WiMax") (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced ("LTE-A"), CDMA, WCDMA, LTE-A, General Packet Radio Service ("GPRS"), Enhanced Data Rates for GSM Evolution ("EDGE"), High Speed Packet Access ("HSPA"), HSPA Plus ("HSPA+"), and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network ("RAN") section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

Beam estimation aims to increase the useful information exploited from a limited number of beam sweeping results. Compared to other known techniques, the beam estimation techniques disclosed herein can improve beam resolution and result in reduced impact of sidelobe. These advantages assist in reaching an in-depth understanding of a MIMO channel using an available limited number of beam sweepings. The increased information from a limited number of beam sweepings results in improved beam acquisition efficiency. The methods and devices disclosed herein utilize a novel beam estimation algorithm which, when used together with beam sweeping in a massive MIMO system, improves efficiency of beam acquisition.

Legacy beam sweeping have certain weaknesses based at least on the initial gain of their first-stage beams and their means of calculating areas for second stage beams. These weakness and resulting suboptimal beam estimations are typically seen in legacy beam sweeping results even where additional beam sweepings are performed. Merely increasing the number of beam sweepings cannot improve the beam resolution to a MIMO channel. A beam scanner is also known as a device for beam estimation. A beam scanner, which is an escalated version of beam sweeping, steers a beam continuously to sweep all the directions of a MIMO channel rather than just M discrete directions. The result of beam scanner is known as spatial spectrum to a channel.

An advanced beam estimation algorithm can improve beam sweeping results by providing improved beam resolution and reducing the impact of sidelobes, thereby making beam acquisition faster and/or more accurate. Herein is disclosed a beam estimation algorithm, a method for beam acquisition according to same, and corresponding devices, which result in an improvement over conventional beam-sweeping in massive MIMO systems and increase efficiency of beam acquisition.

A conventional beam scanner may incorrectly detect only one dominant peak where multiple strong paths are closely located, regardless of the number of beam sweepings performed. Despite the single, detected peak, however, there may be two paths in the channel and thus two beams to acquire. This occurs because the beam resolution is determined by both the number of sweeping beams and by the beam-width (gain). The identification of two paths in a channel requires that the beam-width of sweeping beams be sufficiently narrow. On the other hand, a narrower beam-width of sweeping beams results in a greater number of beam sweepings for covering the same sweeping range, which increases the overhead of beam acquisition.

In addition to limited beam resolution, the nontrivial impact of sidelobes is also another issue faced by beam sweeping. If the beam sweeping sweeps in the direction of sidelobes, it is difficult to identify whether these directions are from a valid path or just a sidelobe of another path. A sidelobe of a strong path may overwhelm the main lobe of a weak path. Thus, if not clearly identified, these sidelobes may be falsely detected and regarded as valid paths in beam sweepings. In the case of multi-stage beam sweeping, additional sweeping branches in next stage are required to be maintained for these spurious paths.

In light of these difficulties with legacy beam sweeping, beam sweeping is not an efficient beam acquisition scheme. In contrast, however, the determined beam estimation according to this disclosure can estimate K beams from discreet Fourier transform beam sweepings if the noise is sufficiently small, even where the beam sweepings happen to sweep at the overlapped mainlobe of two paths, or at the sidelobe of a single path.

Known DoA Estimation Algorithms

Herein is disclosed a novel algorithm for beam estimation. Other known beam estimation algorithms, such as Music, Esprit and Matric-pencil algorithms, are generally unsuitable for beam estimation purposes as described herein because they address the problem of $\{\mu_k\}$=DoA estimation $\{h\}$, which estimates beam directions from samples of h, rather than from the beam sweeping results in terms of y. Moreover, Music and Esprit algorithms require the information found within the MIMO channel correlation matrix $E\{hh^H\}$. Matrix-pencil algorithms require knowledge of some elements in h. Such knowledge of channel is not available from such a limited number of beam sweepings, and thus these well-known DoA estimation algorithms cannot be used directly in the materials disclosed herein.

Monopulse-Radar Method

Although the Monopulse-radar method can be applied to beamed signals, it is only valid when there is only one path in the channel. As the methods and devices disclosed herein address general multi-path cases, monopulse-radar method cannot be applied to this disclosure.

Advanced Signal Processing

Compressive sensing and matrix completion relies on general iteration solutions such as basis pursuit, orthogonal matching pursuit, and CoSamp, and cannot solve the beam acquisition problem in an efficient and deterministic way. Moreover, the solutions resulting from these techniques are not specifically optimized for beam estimation as described herein.

Interpolation

The beam gains $y_m$ can be viewed as samples to the channel at a few discrete directions. The interpolation technique can be applied to interpolate or extrapolate all the beam gains at different directions. Then the first K strongest peaks of beam gains can be viewed as approximations of desirable beam directions $\{\mu_k\}$. The algorithm and method for beam estimation disclosed herein provides multiple benefits over interpolation.

MIMO Wireless Communication Systems, Generally

MIMO systems may employ multiple transmit and receive antennas to transmit multiple data layers on a shared MIMO channel, i.e. a set of shared time-frequency resources. Such MIMO systems may rely on the differing spatial channels between each of the transmit and receive antennas to allow the receiver to individually recover the transmitted data layers from the signals received at the received antennas, which may each be composed of contributions from each transmit antenna that have been altered by noise and other channel effects.

In a MIMO system, each transmit antenna may transmit a separate transmit symbol using the same shared time-frequency resources (e.g. using the same subcarrier or set of subcarriers during a common symbol period). Each receive antenna may then produce a separate receive symbol, where each receive symbol contains a contribution from each transmit symbol that has been altered by the spatial channel between the corresponding receive antenna and each transmit antenna. MIMO receivers may then process the receive symbols to recover the original transmit symbols, which may include applying channel equalization based on channel estimates of each spatial channel in order to individually detect each transmit symbol from the receive symbols. In a multi-subcarrier MIMO case such as for Orthogonal Frequency Division Multiple Access ("OFDMA") or Single Carrier Frequency Division Multiple Access ("SC-FDMA"), each MIMO transmit antenna may transmit a transmit symbol on each of a plurality of subcarriers that collectively compose the shared MIMO channel.

MIMO systems may employ multiple transmitters and/or multiple receivers and/or multiple transceivers, and accordingly may be characterized as Single-User MIMO ("SU-MIMO") or Multi-User MIMO ("MU-MIMO") systems. FIG. 1 shows MIMO system 100, which may be a basic 2×2 SU-MIMO system including MIMO transmitter 110 composed of two transmit antennas $110_1$ and $110_2$ and MIMO receiver 120 composed of two receive antennas $120_1$ and $120_2$. As MIMO channel 130 is shared between a single transmitter (110) and single receiver (120), MIMO system 100 may be classified as an SU-MIMO system.

As shown in FIG. 1, transmitter 110 may transmit two data layers (Layer 1 and Layer 2) on MIMO channel 130 to receiver 120. Transmitter 110 may apply channel coding, scrambling/interleaving, modulation, and antenna mapping on the original data layers to generate transmit symbols $s_1$ and $s_2$ that collectively compose transmit vector $s=[s_1\ s_2]^T$. Transmitter 110 may then transmit each of transmit symbols $s_1$ and $s_2$ via transmit antennas $110_1$ and $110_2$. Transmit symbols $s_1$ and $s_2$ may propagate through MIMO channel 130 and subsequently be received by receive antennas $120_1$ and $120_2$, which may subsequently produce receive symbols $y_1$ and $y_2$ constituting receive symbol vector $y=[y_1\ y_2]^T$. As shown in FIG. 1, both receive symbols $y_1$ and $y_2$ may contain contributions from both transmit symbols $s_1$ and $s_2$, which may be characterized by the channel matrix H of MIMO channel 130 where $H=[h_{1,1}\ h_{1,2};\ h_{2,1}\ h_{2,2}]$ and each $h_{i,j}$ for i,j=1,2 is a complex-valued term characterizing the wireless channel response between transmit antenna $110_j$ and receive antenna $120_i$. Receiver 120 may recover the original data layers by applying MIMO detection on receive vector y.

Including the contribution from additive noise modeled as $n=[n_1\ n_2]^T$ in MIMO channel 130, MIMO system 100 may be modeled according to H, s, y, and n as follows:

$$y=Hs+n \qquad (1)$$

MIMO system 100 and Equation (1) may be analogously expanded to any M×N MIMO system with N transmit antennas (and corresponding transmit symbol vector $s=[s_1, \ldots, s_N]^T$) and M receive antennas (and corresponding receive symbol vector $y=[y_1, \ldots, y_M]^T$), where H denotes the M×N complex channel matrix composed of complex channel response elements $h_{i,j}$, i=1, ..., M, j=1, ..., N, s denotes the complex transmitted symbol vector, n denotes the complex additive noise, and y denotes the complex received noisy symbol vector.

Figure 2:
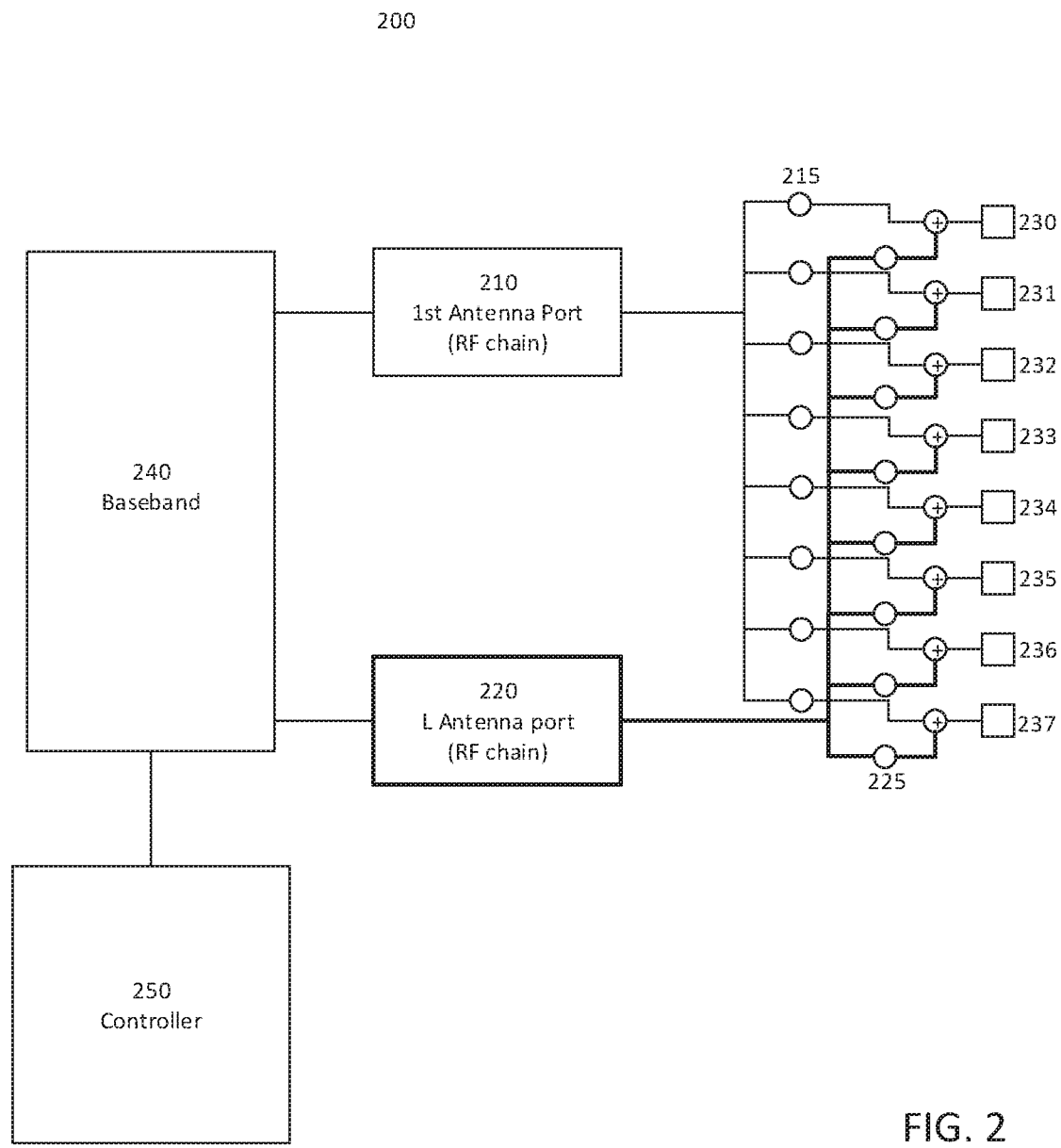
FIG. 2 shows an internal arrangement for a system model for a communication device.

FIG. 2 shows an internal arrangement for a system model 200 for a communication device which is configured to implement a hybrid beamforming scheme to communicate with other devices in an aspect of this disclosure. It is appreciated that system model 200 is exemplary in nature and may thus be simplified for purposes of this explanation.

The digital domain of the base station consists of a plurality of antenna ports, 210-212. In this example, two antenna ports are shown (i.e. L=2), but it appreciated more systems with more antenna ports are included in this disclosure, i.e. L>2. Each antenna port consists of an RF chain, which may include RF devices such as transmitters, receivers, cables, amplifiers, attenuators, measurement instruments, loads, Digital to Analog Converters (DACs), Analog to Digital Converters (ADCs), etc. The antenna ports are connected to an array of N antenna elements, 230-237, which operate in the analog domain. In antenna system model 200, there are eight antenna elements shown, i.e. N=8, but it is appreciated that other quantities of antenna elements may be implemented in this disclosure. Phase shifters (a first set in the column under 215 and a second set in the column above 225) control the phase of the signal transmitted by each antenna element 230-237 in analog beamforming by manipulating the analog beamforming weight. By applying a phase shift to the signals transmitted by the antenna elements 230-237, the direction of constructive interference may be manipulated as required. The amplitudes and phases of the signals may be adjusted by applying suitable antenna weights.

A baseband unit 240 is connected to the radio frequency unit (encompassing antenna ports 210-220 and antenna elements 230-237) of base station 200 and may perform the baseband processing of mobile communication signals. Baseband unit 240 may further provide or receive digital mobile communication signals to or from at least one antenna port or antenna element. Elements 210-237 may be responsible for radio frequency processing of mobile communication signals and may include digital (e.g. the antenna ports 210-220) as well as analog circuitry (e.g. the antenna elements 230-237) in order to receive and perform initial processing on wireless radio frequency signals. The baseband unit 240 may exchange digital mobile communication data with one or more antenna ports or antenna elements over an optical fiber or similar high-speed connection, such as using a Common Public Radio Interface (CPRI) standard over an optical fiber data link.

It is understood that the components of base station 200 and all internal components thereof (e.g. the baseband hardware, radio frequency hardware, memory components, compression components, etc.) may be structurally implemented as hardware, software executed on hardware or a mixture thereof. Specifically, baseband unit 240 and radio frequency units 210-237 may include one or more digital processing circuits, such as logic circuits, processors, microprocessors, Central Processing Units (CPUs), Graphics Processing Units (GPUs) (including General-Purpose Computing on GPU (GPGPU)), Digital Signal Processors (DSPs), Field Programmable Gate Arrays (FPGAs), integrated circuits, Application Specific Integrated Circuits (ASICs), or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of base station 200 may be detailed herein substantially in terms of functional operation in recognition that a person of skill in the art may readily appreciate the various possible structural realizations of each component that will provide the desired functionality.

While the description may focus on the downlink or uplink path, it is understood that base station 200 may additionally be capable of in either direction.

Base station 200 may receive wireless uplink signals using antenna array 230-237. An analog combiner may then combine the resulting uplink data signals, such as by combining the uplink data signals from sets of two or more antennas of antenna array 230-237 in the analog domain. Analog combiner may thus yield analog data streams which indicate the number of analog data streams produced by analog combiner, which may be equal to or less than the actual number of physical receive antennas in antenna array 230-237.

Base station 200 may process the analog data streams received from analog combiner using processing circuitry. It may perform automatic gain control (AGC) and analog-to-digital conversion (ADC) on the analog data streams received from analog combiner and subsequently perform Fast Fourier Transform (FFT) processing in order to generate frequency domain symbols in the antenna ports 210-220.

Base station 200 may therefore further include channel estimation (CE) and compression hardware, which may be composed of digital processing circuitry in the antenna ports 210-220 and may thus require extra calculation and processing hardware, which may be utilized in order to perform channel estimation and calculate compression filters.

Baseband unit 240 may receive the data and perform equalization and coordinated processing. Baseband unit 240 may include digital processing circuitry and memory components, among other components.

The baseband unit 240 may be configured to implement any of the processes disclosed herein, including, but not limited to, channel truncation, analog beamforming generation, and/or digital beamforming generation.

Controller 250 may be connected to the baseband unit 240 and may be configured, among other things, to control higher level processing.

Figure 3:
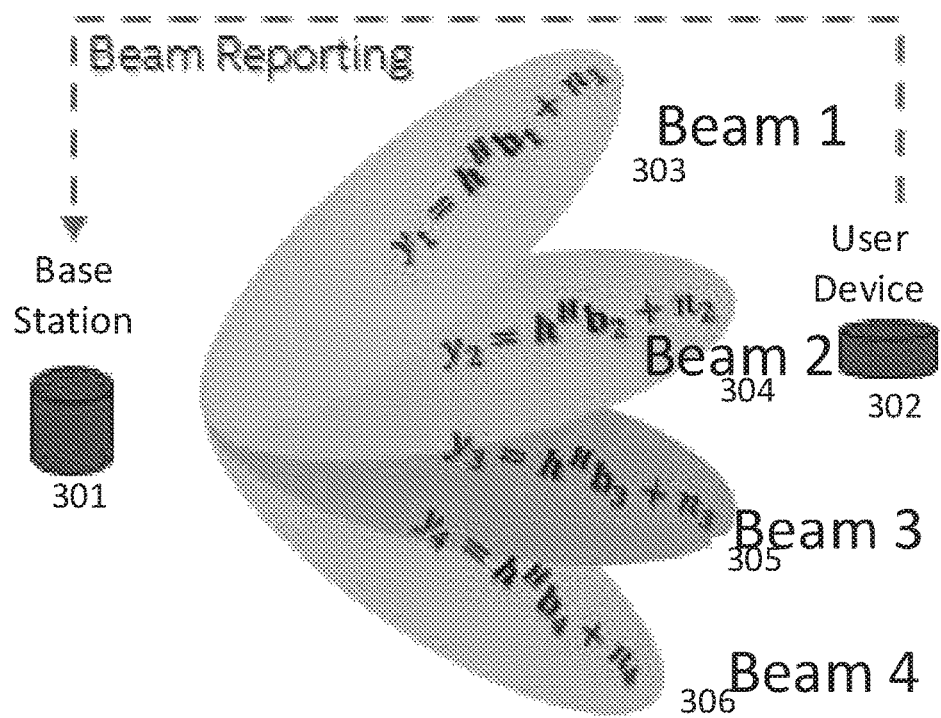
FIG. 3 shows a first-stage beamforming procedure between a base station and a user device.

FIG. 3 shows a first-stage beamforming procedure between a base station and a user device. This simplified variation assumes the base station 301 to have a uniform linear array of N antennas and the user device 302 to have a singular antenna. FIG. 3 shows the base station employing M antenna beams for beam sweep, where M=4, and therefore the beams are notated as 303-306. In the formulas attributed to each of the four beams, h is the MIMO channel vector between the base station and the user device, and $b_m$ is the mth sweeping mean, wherein m=1, ... M. According to this figure, the base station 301 sends four first-stage beamforming reference beams.

Figure 4:
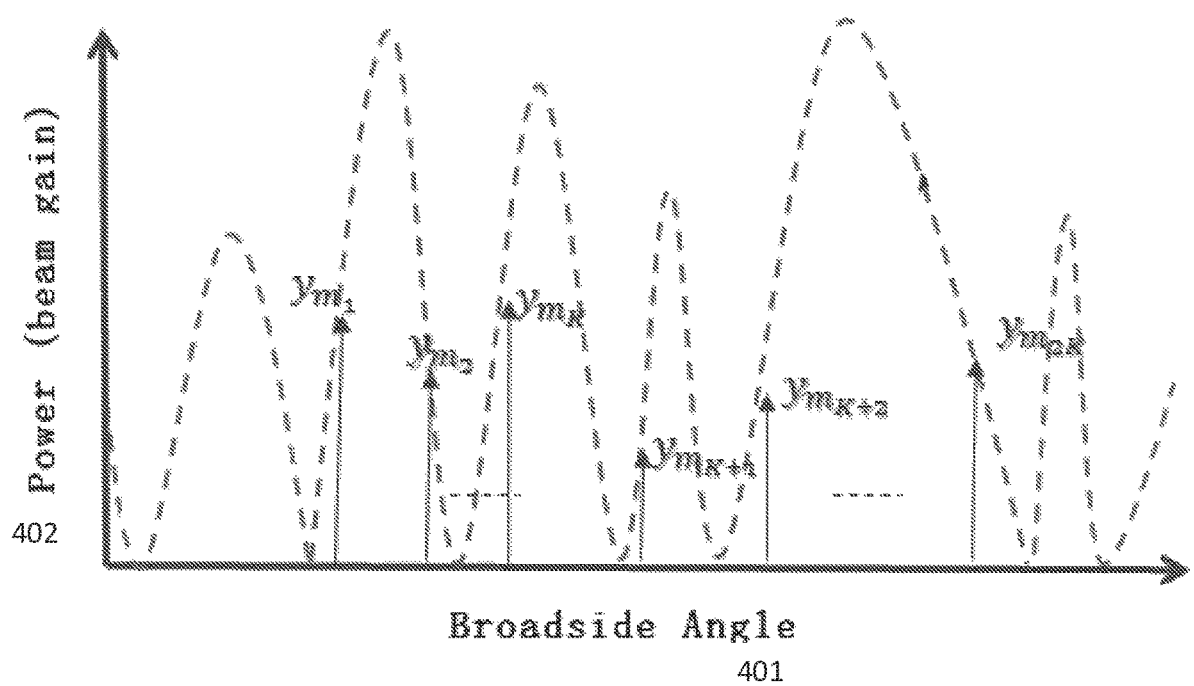
FIG. 4 shows indices of discrete Fourier transform beam sweeping.

FIG. 4 shows the 2K indices of discrete Fourier transform beam sweeping as denoted by $m_1, \ldots, m_{2K}$. This figure depicts the broadside angle 401 of the reference beams with respect to the beam gain 402.

Figure 5:
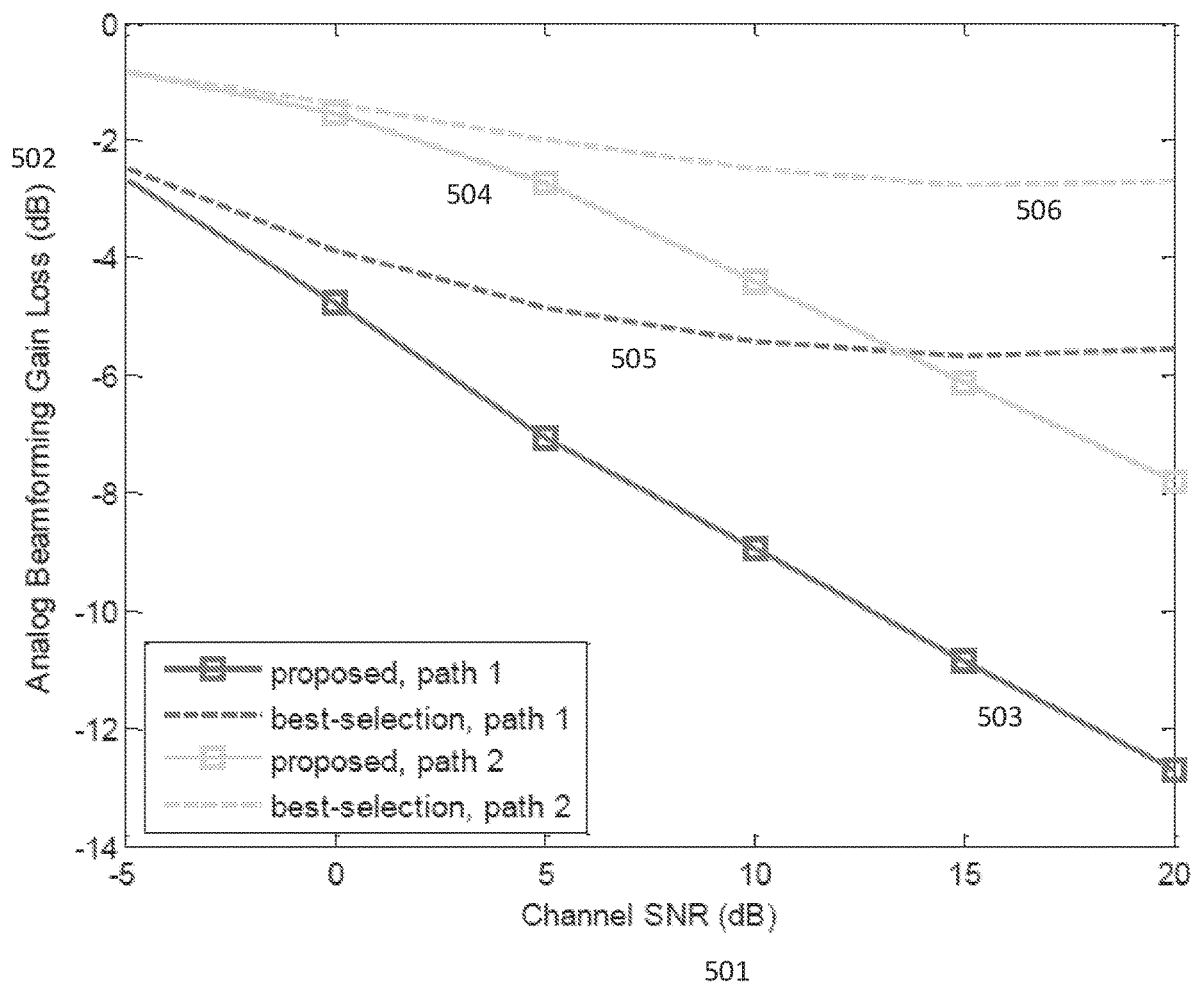
FIG. 5 shows an evaluation of the proposed algorithm by depicting gain loss in a broad beam estimation stage under a two-cluster channel compared to the conventional beam-sweeping method.

FIG. 5 shows an evaluation of the proposed algorithm by depicting gain loss in a broad beam sweeping stage under a two-cluster channel compared to the conventional beam-sweeping method. Because the conventional method relies on a single best fist-stage reference beam, it will be described herein as the "best-selection" method. In this model, eight beams are employed for beamsweeping (M=8). Specifically, the x-axis 501 depicts channel signal to noise ratio, and the y-axis 502 depicts analog beamforming gain loss in decibels. The first proposed path 503 is depicted as ranging from less than −2 dB gain loss at −5 dB signal to noise ratio to less than −12 dB gain loss at 20 dB signal to noise ratio. The second proposed path 504 is depicted as ranging from less than zero dB at −5 dB signal to noise ratio to approximately −8 dB gain loss at 20 dB signal to noise ratio. This is in contrast to the conventional method of beamforming selection, herein depicted as the "best-section" method, which shows a first path 505 at less than −2 dB gain loss at −5 dB signal to noise ratio, ranging to almost −6 dB gain loss at −20 dB signal to noise ratio, and a second path 506 which shows less than zero dB gain loss at −5 dB signal to noise ratio and less than −2 dB gain loss at 20 dB signal to noise ratio. This figure depicts the analog beamforming gain loss for the first and second beam information in a MIMO channel under the stage of broad beam sweeping (mainlobe beam width π/2 with M=8). The results are compared to conventional best-selection method, where the beam direction with the largest and the second largest beam gains are naively treated as the first and second beam information. It is notable that in the simulated channel, the impacts of noise to the proposed algorithm are evaluated by signal to noise ratio.

Figure 6:
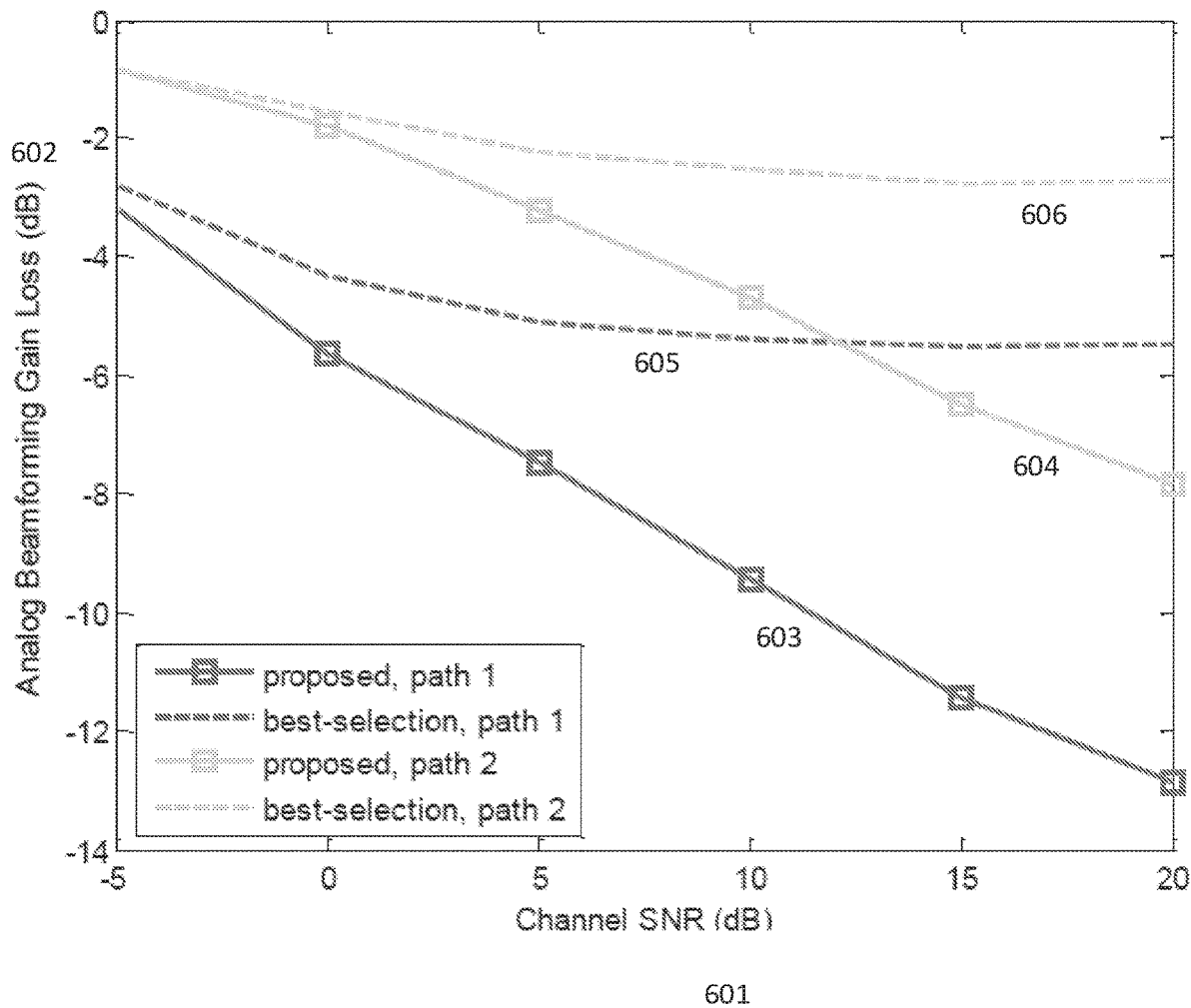
FIG. 6 shows an evaluation of the proposed algorithm by depicting gain loss in a broad beam estimation stage under a two-cluster channel compared to the conventional beam-sweeping method.

FIG. 6 shows an evaluation of the proposed algorithm by depicting gain loss in a broad beam sweeping stage under a two-cluster channel compared to the best-selection method. In this model, sixteen beams are employed for beamsweeping (M=16). The x-axis 601 depicts channel signal to noise ratio, and the y-axis 602 depicts analog beamforming gain loss in decibels. The first proposed path 603 is depicted as ranging from less than −2 dB gain loss at −5 dB signal to noise ratio to less than −12 dB gain loss at 20 dB signal to noise ratio. The second proposed path 604 is depicted as ranging from less than zero dB at −5 dB signal to noise ratio to approximately −8 dB gain loss at 20 dB signal to noise ratio. This is in contrast to the best-section method, which shows a first path 605 at less than −2 dB gain loss at −5 dB signal to noise ratio, ranging to almost −6 dB gain loss at −20 dB signal to noise ratio, and a second path 606 which shows less than zero dB gain loss at −5 dB signal to noise ratio and less than −2 dB gain loss at 20 dB signal to noise ratio. This figure depicts the analog beamforming gain loss for the first and second beam information in a MIMO channel under the stage of broad beam sweeping (mainlobe beam width π/2 with M=16). The results are compared to the conventional best-selection method, where the beam direction with the largest and the second largest beam gains are naively treated as the first and second beam information. As shown in both FIG. 5 and FIG. 6, by using the determined beam estimation algorithm, the analog beamforming gain loss is reduced by about 6 dB at a 20 dB channel SNR from the conventional best-selection method. The benefit of using the beam estimation algorithm may be greater for the first beam information than for the second beam information, since the strongest beam gains are more robust to noise.

FIG. 5 and FIG. 6 depict an analysis of the analog beamforming gain loss for the first and second beam information in a MIMO channel under the stage of broad beam sweeping (mainlobe beam width π/2 with M=8) and narrow beam sweeping (mainlobe beam width π/4 with M=16). The results are compared to conventional best-selection method. Note that in the simulated channel, the impacts of noise to the proposed algorithm are considered by changing to a different channel SNR.

Figure 7:
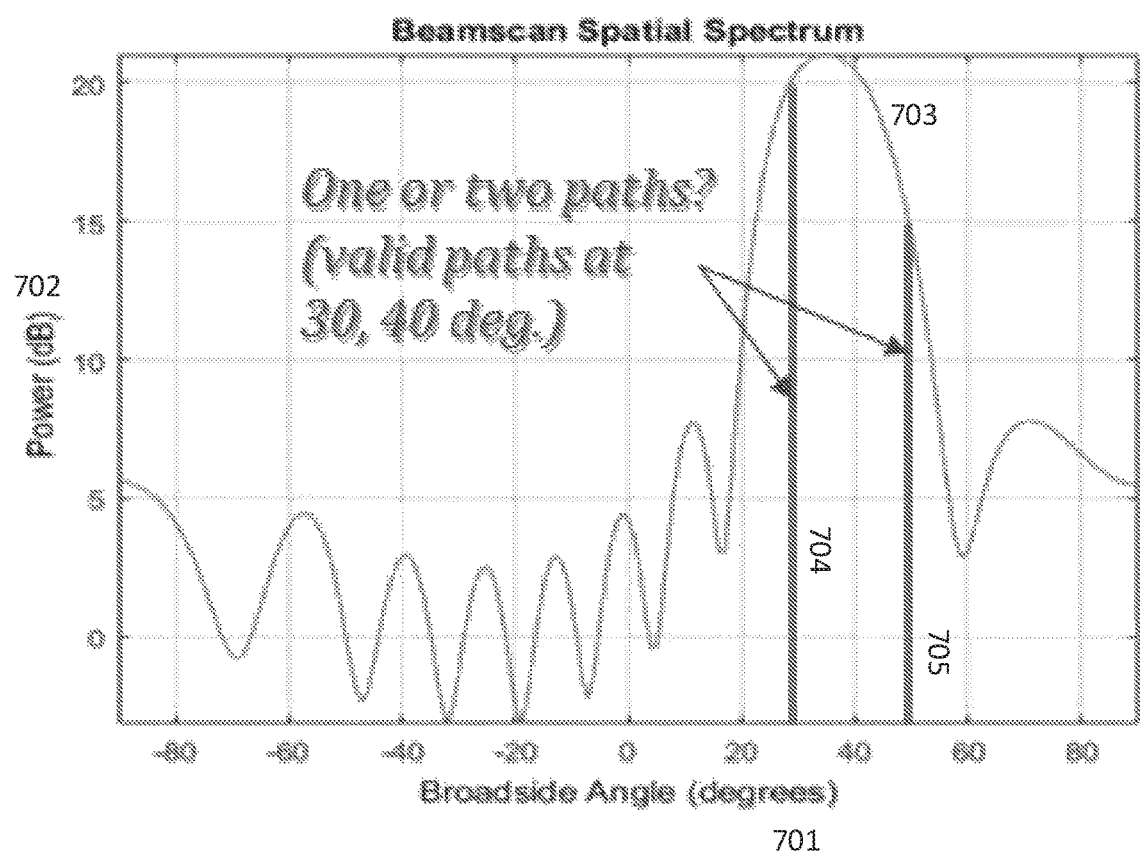
FIG. 7 shows a conventional beam scanning, wherein only one dominant peak is shown for two paths.

FIG. 7 shows the results of a conventional beam scanner, wherein only one dominant peak is shown for two paths. FIG. 7 depicts a beamscan spatial spectrum, shown as the broadside angle 701 along the x-axis and the power in decibels 702 along the y-axis. In this case, path one 704 is shown at approximately 30 degrees, and path two 705 is shown at approximately 50 degrees. Despite the presence of two valid paths, 704 and 705, only a single dominant curve 703 is depicted. This phenomenon occurs because the beam resolution is not only determined by the number of sweeping beams, but also by their beam-width. That is to say that this phenomenon would occur even where the number of beam sweepings performed were increased. To identify two paths in a channel, the beam-width of the sweeping beams needs to be sufficiently narrow, rather than simply repeating beam sweeping with a wider beam. Narrower beam-widths, however, require more beams to cover the same sweeping range as a beam-sweeping with wider beams, which naturally increases the overhead of beam acquisition.

Figure 8:
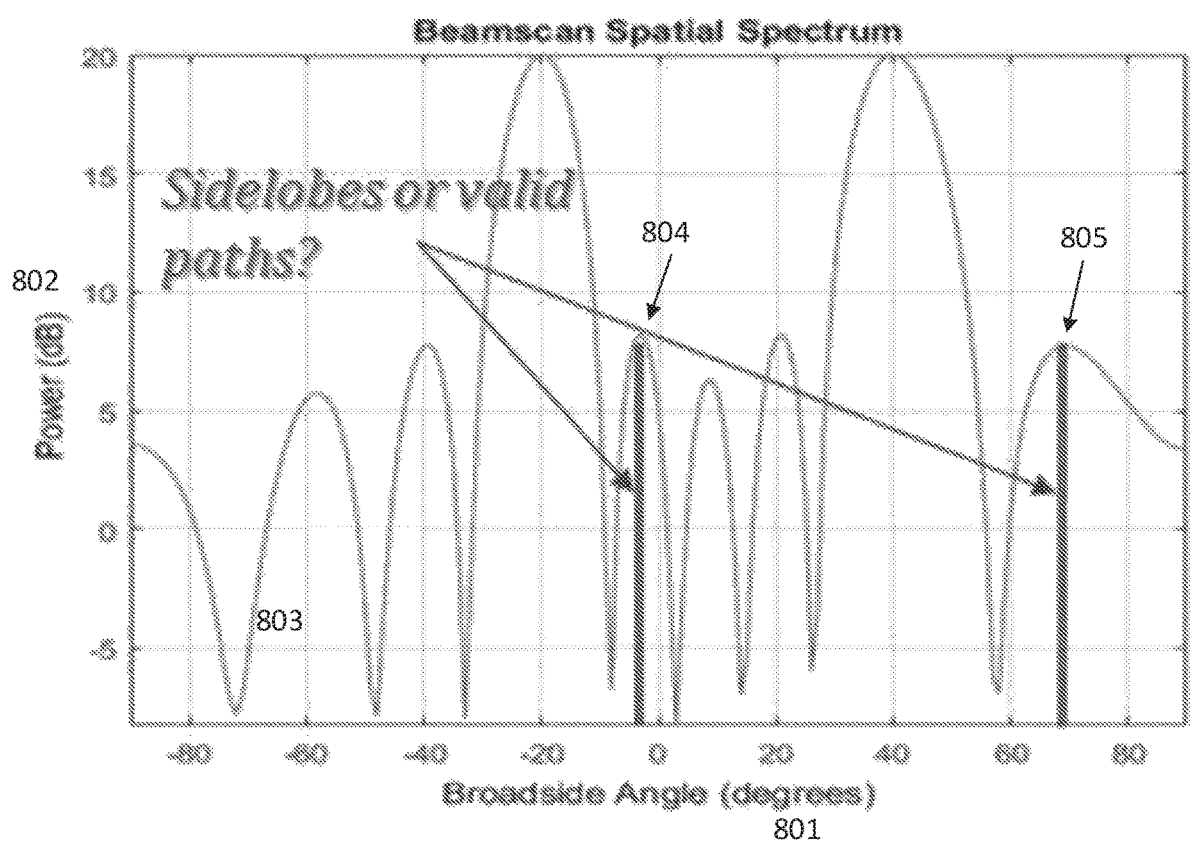
FIG. 8 shows a beamscan spatial spectrum depicting the relevance of sidelobes in beamscanning.

FIG. 8 shows a beamscan spatial spectrum depicting the relevance of sidelobes in beamscanning. In this beamscan spatial spectrum, the broadside angle 801 is depicted along the x-axis; the power 802 is depicted along the y-axis; and the beamscan spatial spectrum result is depicted as 803. In addition to limited beam resolution, the nontrivial impact of sidelobes are also another issue met by beam sweeping. FIG. 8 demonstrates the impact of sidelobes. As beamscanning is performed, the beam scans may occur in the direction of sidelobes, which are shown in FIG. 8 as 804 and 805. In this case, it may be difficult to identify whether these directions are from a valid path or just a sidelobe of another path. Further, a sidelobe of a strong path may overwhelm the mainlobe of a weak path. Thus, if not clearly identified, these sidelobes 804 and 805 may be falsely detected and regarded as valid paths in beamscans. In the case of multi-stage beamscanning, additional scanning branches in the next stage are required to be maintained for these spurious paths. Therefore, pure beam scanning may not be an efficient beam acquisition scheme. In contrast to traditional beamscanning, and provided that the noise is sufficiently limited, the determined beam estimation algorithm and procedure can estimate K beams from discrete Fourier transform beamscans, even when beamscans happen to sweep at the overlapped mainlobe of two paths, or at the sidelobe of a single path.

Figure 9:
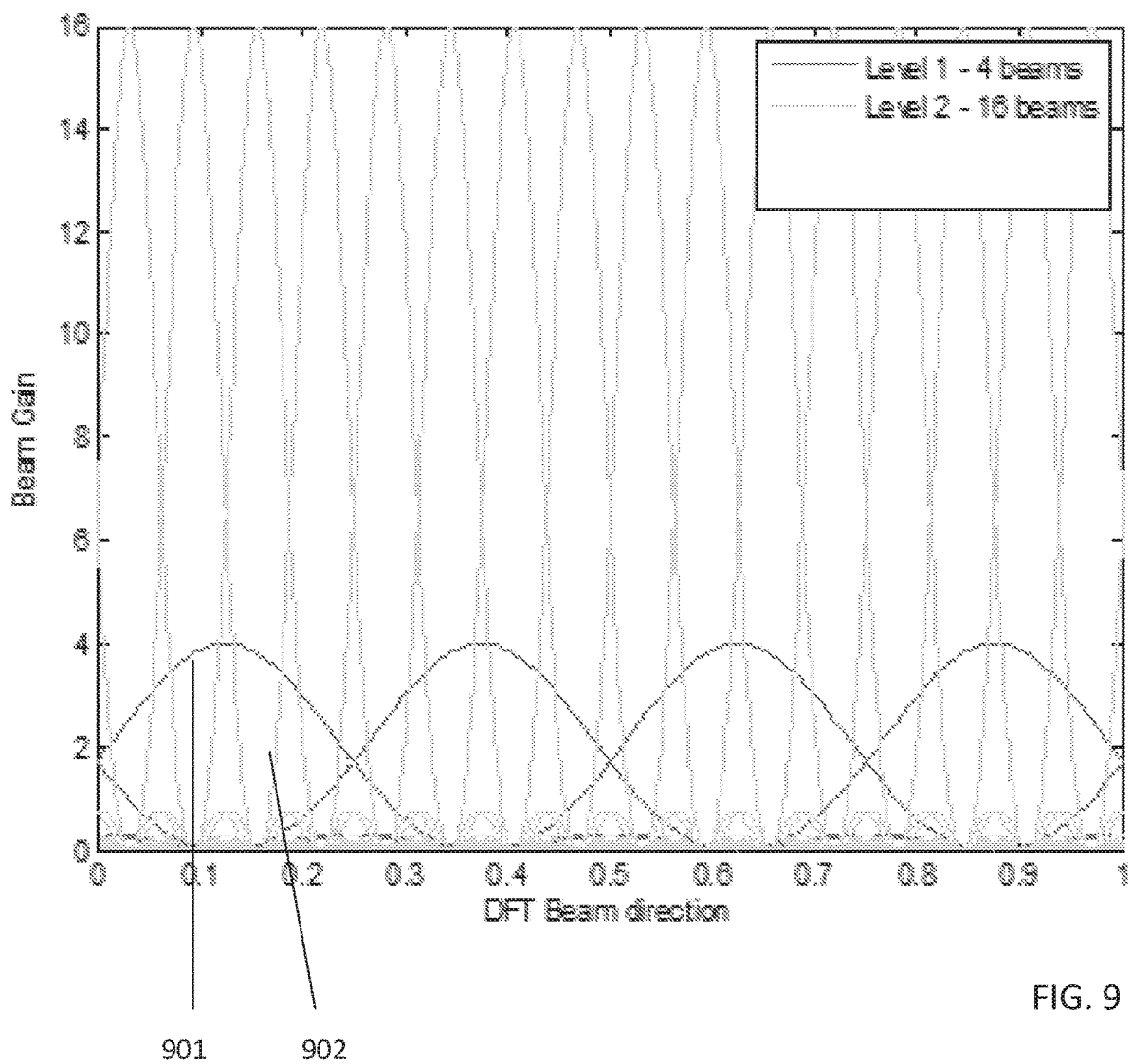
FIG. 9 depicts a two-stage beam estimation scheme with two-level DFT beams.

FIG. 9 depicts a two-stage beamscanning scheme with two-level discrete Fourier transform beams. The wider first-stage beams are shown as 901, and the narrower second-stage beams are shown as 902. There are four broad first-stage discrete Fourier transform beams 901, and each broad first-stage beam 901 is associated with 4 narrow second-stage beams 902.

Figure 10:
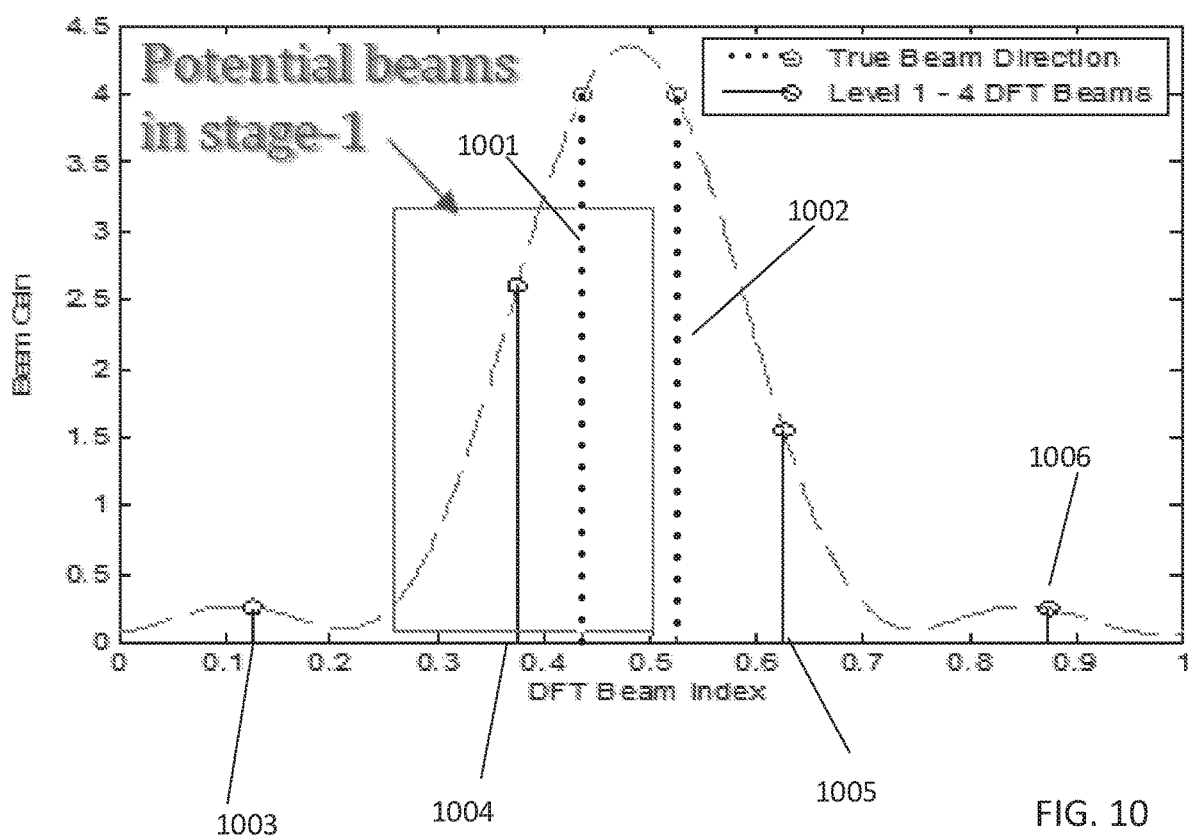
FIG. 10 depicts a first shortcoming of a conventional beamsweeping approach.
Figure 11:
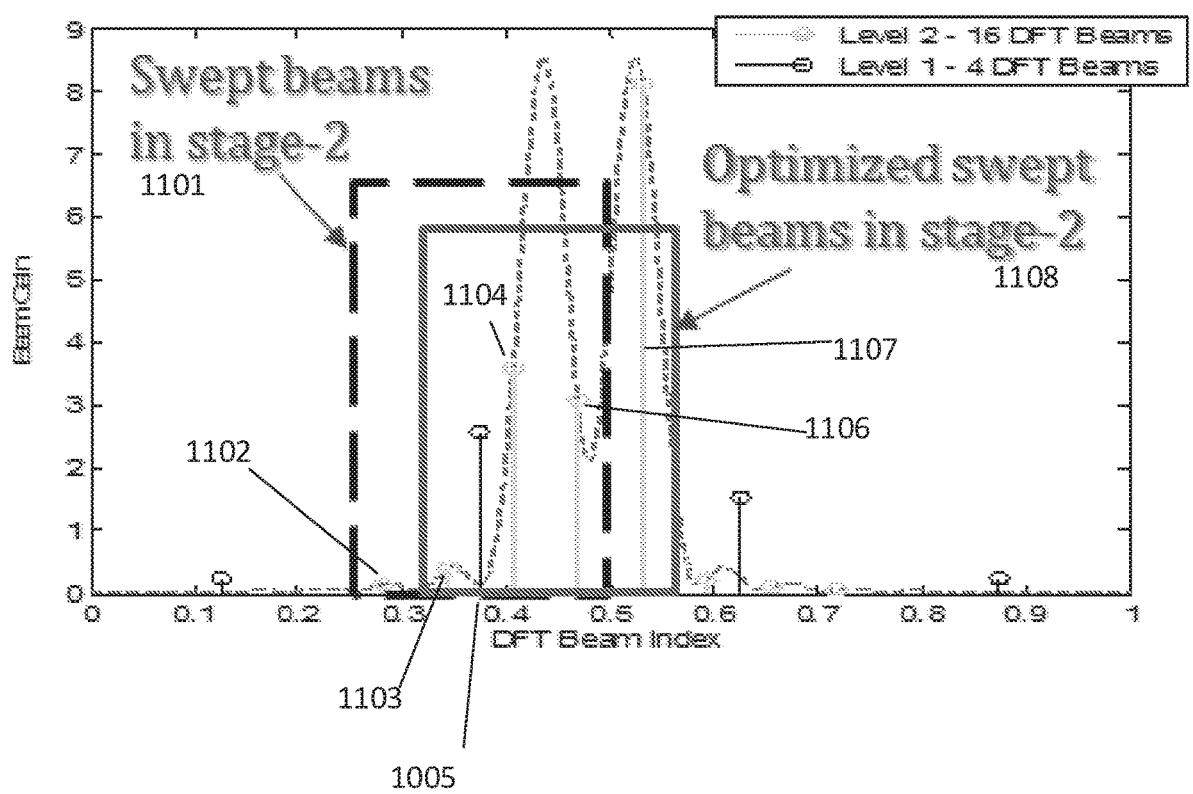
FIG. 11 shows a comparison of a conventional beam-sweeping operation with an optimized beam estimation operation.

FIGS. 10 and 11 demonstrate shortcomings of a conventional beamscanning approach. In FIG. 10, a conventional first-stage beamscanning is depicted. A channel of two paths 1001 and 1002 is depicted, such that there are two beam directions to acquire. In the first-stage beamforming sweep, four first-stage wide beams are sent: 1003, 1004, 1005, and 1006. Of these, beam 1004 is recorded as having the strongest signal, and therefore, in a conventional beamscanning method, beam 1004 would be selected, and the second-stage reference beams would be the second-stage beams that correspond to first-stage beam 1004.

FIG. 11 compares the results of a conventional beamscanning operation with a beam estimation operation as described herein, based on the scenario depicted in FIG. 10. In FIG. 11, the swept beams under the conventional method are shown within the areas demarcated by the dotted line 1101, based on beam 1004 having returned the best result in the first-stage. The corresponding second-stage beams are 1102, 1103, 1105, and 1106. These second-stage beams do not include beam 1107, which would be an ideal beam to select based on the two-channel response depicted in FIG. 10 beams 1001 and 1002. Because beam 1107 is not included in the beamscanning range based on the conventional method 1101, the results may be sub-ideal. The optimized method disclosed herein would take into account the two highest first-stage beams (FIGS. 10 1004 and 1006). The beam area covered by the optimized method is depicted as 1108. Thus, by applying the determined beam estimation algorithm to the reference beam result in the first-stage, an estimate of two beam directions can be obtained. Then the set of reference beams in the second-stage can be shifted somewhat from 1101 to 1107. This revised second-stage set of reference beams 1108 helps to ensure that the highest peak will not be missed.

Figure 12:
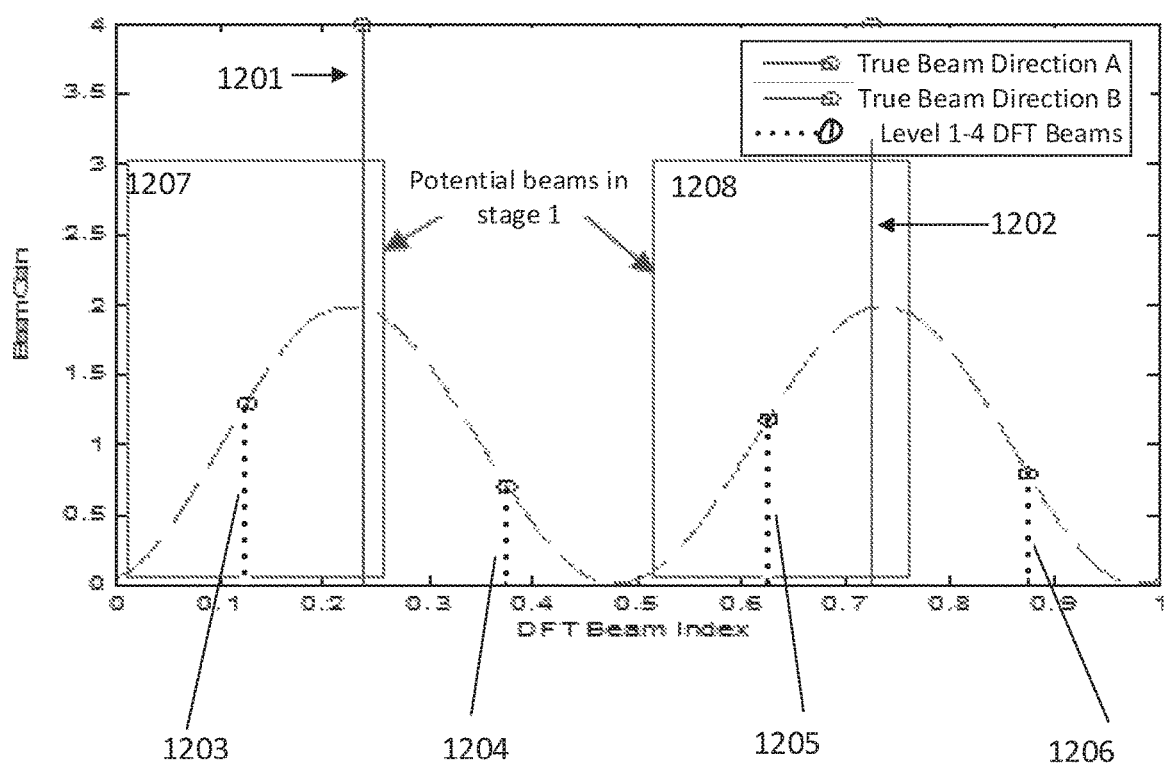
FIG. 12 shows an optimized beam estimation algorithm in an environment with two distantly removed channels.

The beam estimation algorithm and method as described herein offers additional benefit where the first-stage beam estimation yields two potential channels far apart from one another. In FIG. 12, there are two paths 1201 and 1202, which are considerably separated from one another. In a first-stage beam estimation, first-stage beams 1203, 1204, 1205, and 1206 are transmitted. Of these first-stages beams, beams 1203 and 1205 have the two strongest gains. In conventional multi-stage beam sweeping scheme, each of these broad beams 1203 and 1205 is further swept by four narrow beams in the second-stage. This would require eight second-stage beams, as depicted in FIG. 13, which is an increase in overhead for the beam estimation procedure.

Figure 13:
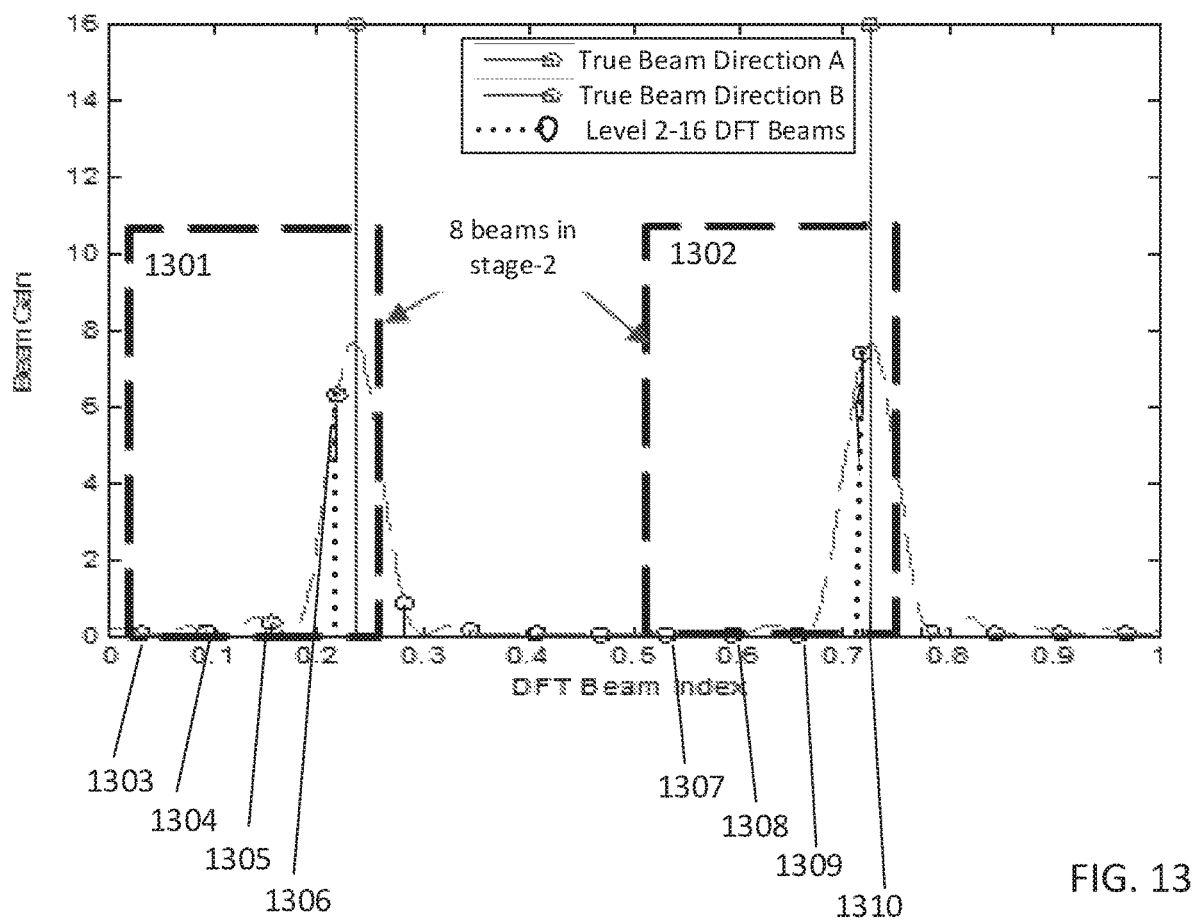
FIG. 13 shows a second-stage beam estimation procedure using eight beams.

As stated above, FIG. 13 shows a second-stage beam estimation procedure using eight beams, in accordance with the first-stage beam estimation procedure depicted in FIG. 12. In this case, and because there were two first-stage beams with considerable separation, the second-stage will often include two separate beam estimation regions 1301 and 1302, wherein each beam estimation region includes one of the two first-stage beams with the greatest gain. According to the conventional method, four second-stage beam estimation beams would be transmitted for each of the beam estimation regions, such that, as depicted in FIG. 13, the first second-stage beam estimation region 1301 would include second-stage beam estimation beams 1303, 1304, 1305, and 1306, and the second second-stage beam estimation region 1302 would include second-stage beam estimation beams 1307, 1308, 1309, and 1310.

Figure 14:
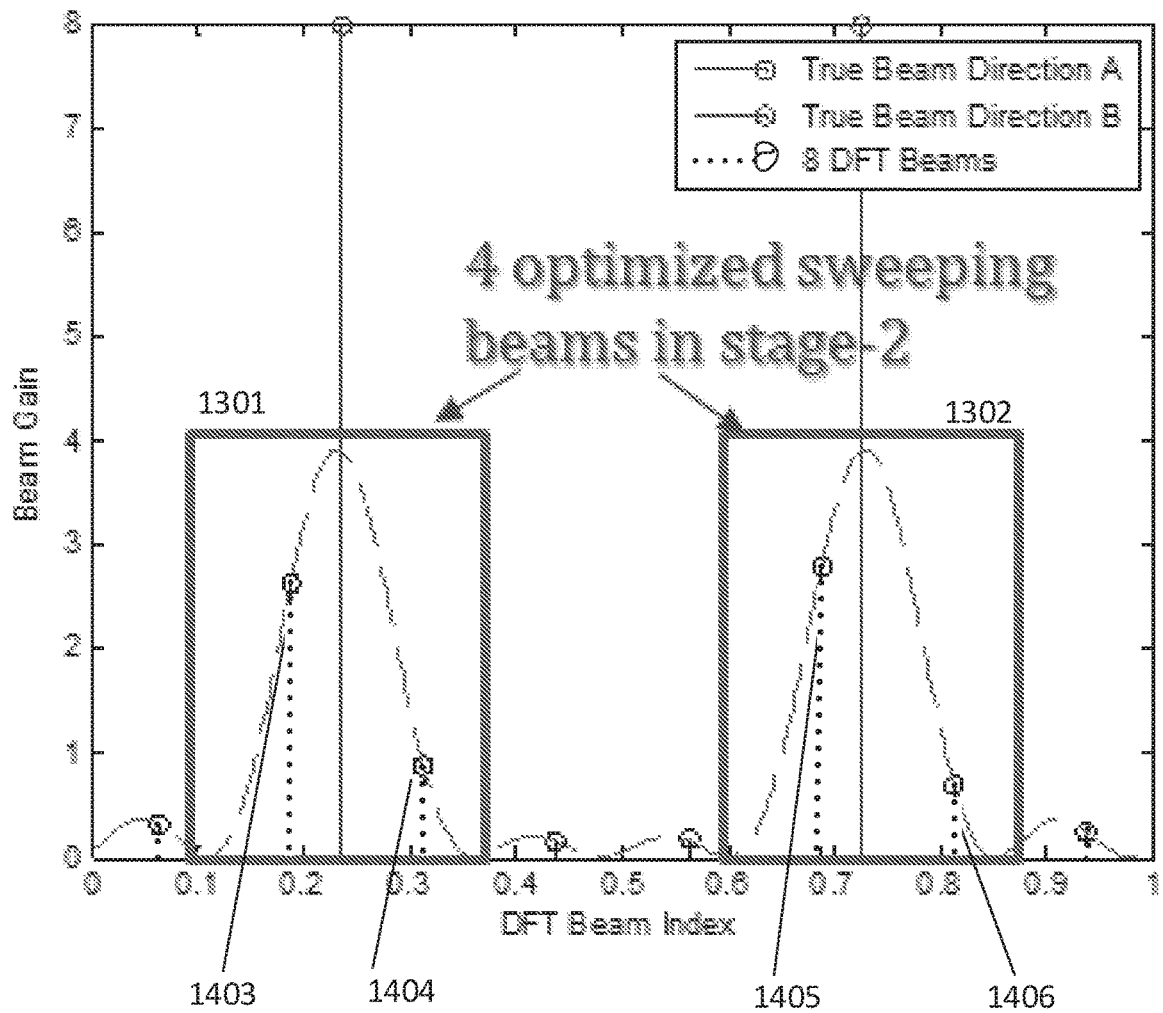
FIG. 14 shows the second-stage beam estimation function according to the beam estimation algorithm.

FIG. 14 shows the second-stage beam estimation function according to the beam estimation algorithm herein, wherein the first-stage beam estimation revealed two best beam that are substantially separated from one another. In contrast to the conventional result, which is depicted in FIG. 13, the beam estimation algorithm can estimate of locations of two paths, and then only two beams of intermediate beam width are swept in the second-stage for each of these two paths. Moreover, the discarded stage-one beam gains become useful information for the beam estimation, as they are used to better select second-stage beam estimation locations within the two second-stage beamforming regions 1301 and 1302. As described, the first second-stage beam estimation region 1301 will have two second-stage beam estimation beams 1403 and 1404, and the second second-stage beam estimation region 1302 will have two second-stage beam estimation beams 1405 and 1406. Using this method, the improved beam resolution does not result directly from increased density of the second-stage sweeping beams.

Figure 15:
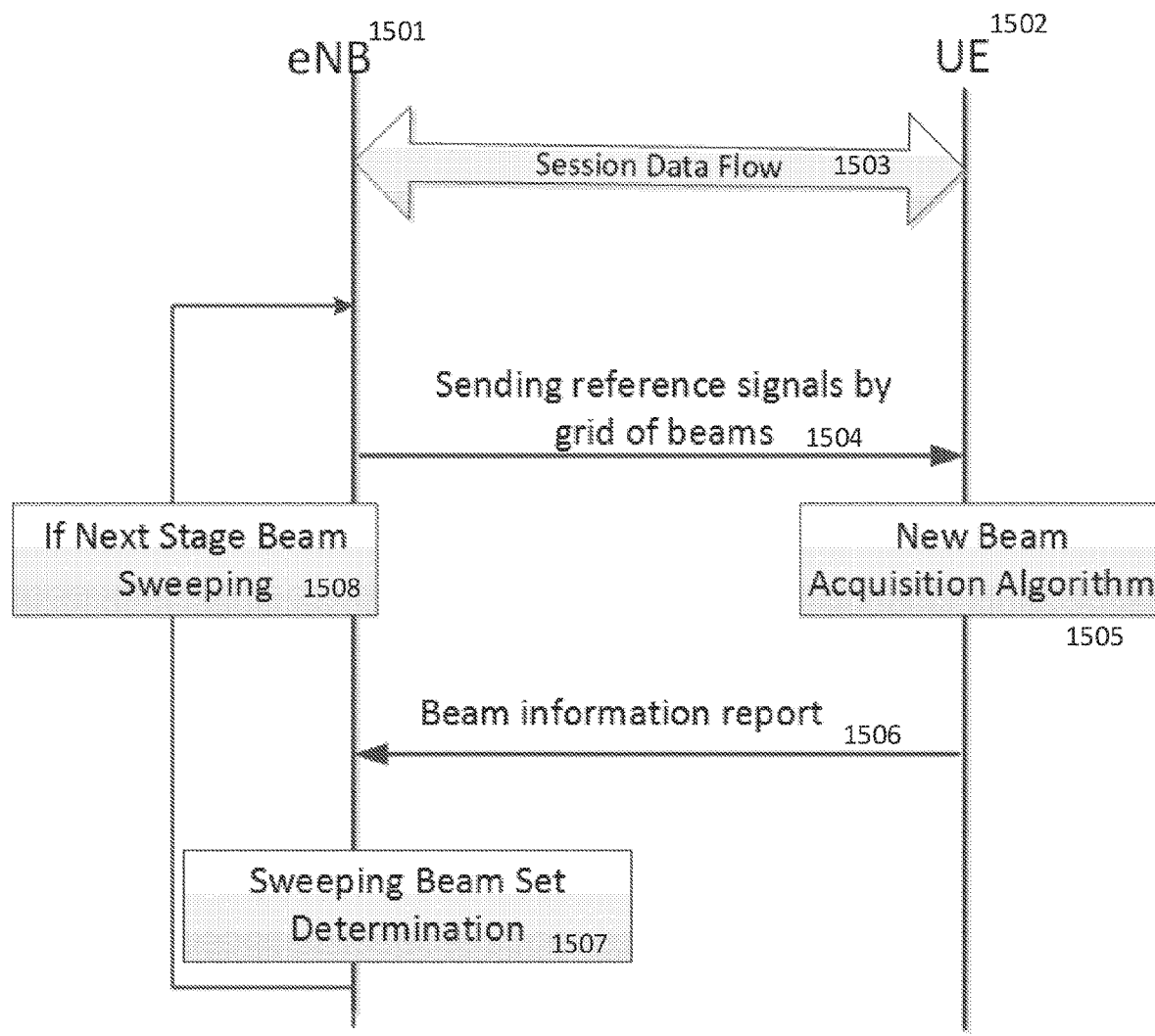
FIG. 15 shows the beam estimation method as exchanges between a base station and a user device.

FIG. 15 depicts the beam estimation method as exchanges between a base station/eNodeB 1501 and a user device (UE) 1502. Following session data flow 1503, the base station 1501 transmits first stage reference beams 1504 to the user device 1502. The next step can be performed according to at least two cases. According to Case I, the user device 1502 employs the beam estimation algorithm 1505 based on the received first-stage beam sweeping beams, and then the user device 1502 transmits a beam information report 1506 including the results of the beam estimation optimization algorithm. Performing these steps according to Case I requires that the user device 1502 be aware of the beamforming codewords for the beam estimation beams used in the first-stage. Where the user device 1502 is not aware of the beamforming codewords for the stage-one beam estimation beams, then the user device 1502 must process the reference signals 1504 according to Case II. In Case II, the user device reports to the base station the first 2K strongest beam gains, wherein K is the number of antennas at the user device. The base station then receives the report of the best 2K beam gains and, using this information, performs the sweeping beam set determination 1507 using the beam estimation algorithm. Where a second or subsequent-stage of beam estimation is to be performed, the base station transmits the next set of beam estimation beams 1508.

Figure 16:
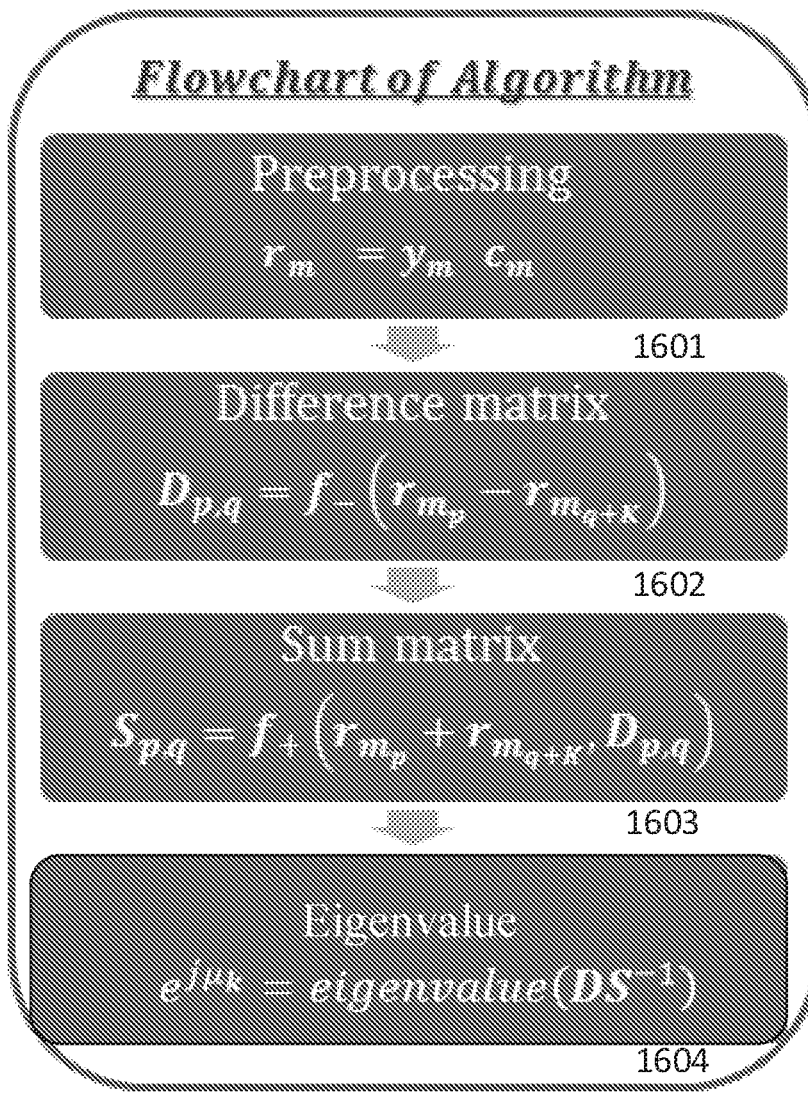
FIG. 16 depicts a flowchart for the beam estimation algorithm.

FIG. 16 depicts a flowchart for the beam estimation algorithm. The algorithm is characterized by a preprocessing step 1601, a difference matrix step 1602, a sum matrix step 1603, and in eigenvalue estimation 1604. Without loss of generality, the index of the first 2K strongest DFT beam sweeping gains are denoted as $\{m_1, \ldots, m_{2K}\}$. The preprocessing step 1601 is characterized by the formula:

$$r_{m_p} = y_{m_p} c_{m_p} \tag{1}$$

wherein $y_{m_p}$ is the beam gain, and wherein $$c_{m_p} = \frac{je^{j\frac{N\theta_{m_p}}{2}}}{2(-1)^{m_p}} \tag{2}$$

With respect to the difference matrix step 1602, a new matrix D of size K×K is constructed by its (p,q)th element as A new matrix D of size K×K is constructed by its (p,q)th element as $$D_{p,q} = \frac{r_{m_p} - r_{m_{q+K}}}{e^{-j\theta_{m_p}} - e^{-j\theta_{m_{q+K}}}} \tag{3}$$

where p,q=1, . . . , K. With respect to the sum matrix step 1603, a new matrix S of size K×K is constructed by its (p,q)th element as $$S_{p,q} = \frac{1}{2}\left(r_{m_p} + r_{m_{q+K}} + D_{p,q}\left(e^{-i\theta_{m_p}} + e^{-i\theta_{m_{q+K}}}\right)\right) \tag{4}$$

With respect to the eigenvalue estimation 1604, the acquired beam information is shown in the phases of the eigenvalues of constructed matrix $DS^{-1}$, wherein $$e^{j\mu_k} = \text{eigenvalue}(DS^{-1}) \quad (5)$$

Figure 17:
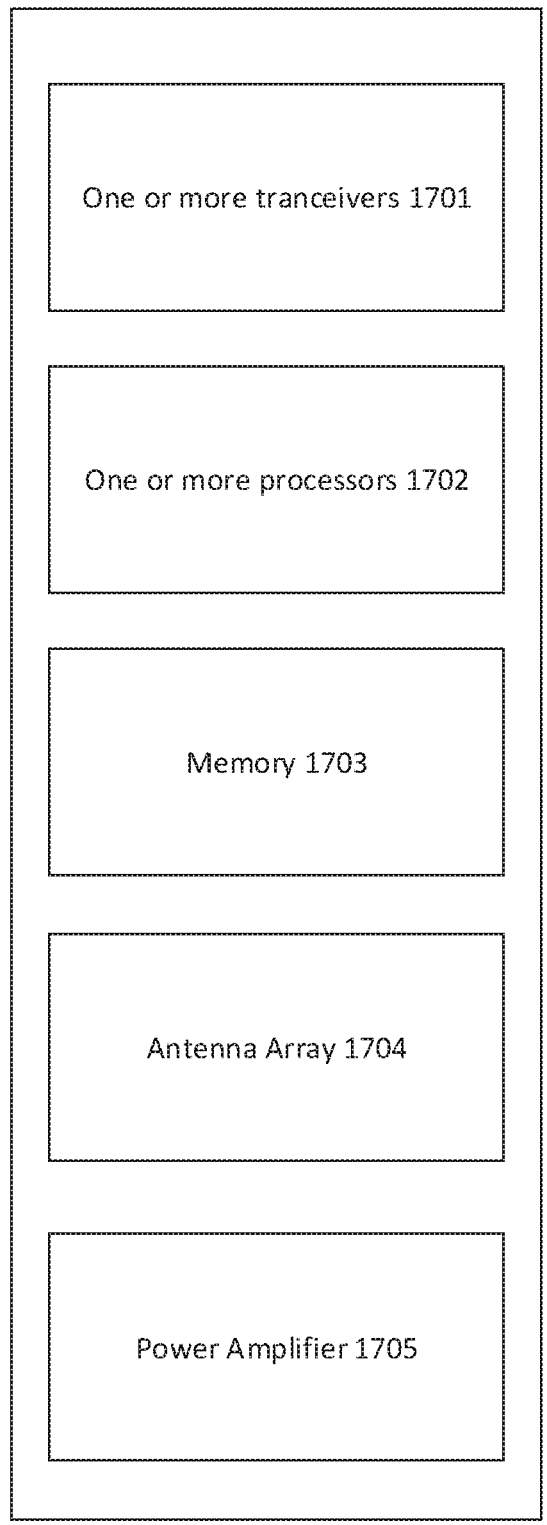
FIG. 17 shows a first device for beam estimation.

FIG. 17 shows a device for beamforming estimation, as computed by a base station, including a one or more transceivers 1701, configured to receive a plurality of first-stage reference beams; and one or more processors 1702, configured to determine a received signal quality of the plurality of first-stage reference beams; to identify at least a first greatest received signal quality and a second greatest received signal quality; and to determine a second-stage reference beam region based on reference beams corresponding to the first greatest received signal quality and the second greatest received signal quality. The device for beamforming estimation may also comprise a memory 1703, configured to store at least one of a first-stage reference beam identifier; a first quality identifier; a second-stage reference beam region, or a second-stage reference beam identifier; an antenna array 1704, configured to receive an outbound signal from a power amplifier or to receive an inbound signal for delivery to the transceiver; and a power amplifier 1705, configured to receive the outbound signal from the transceiver, to amplify the outbound signal, and to deliver the amplified signal to the antenna array.

Figure 18:
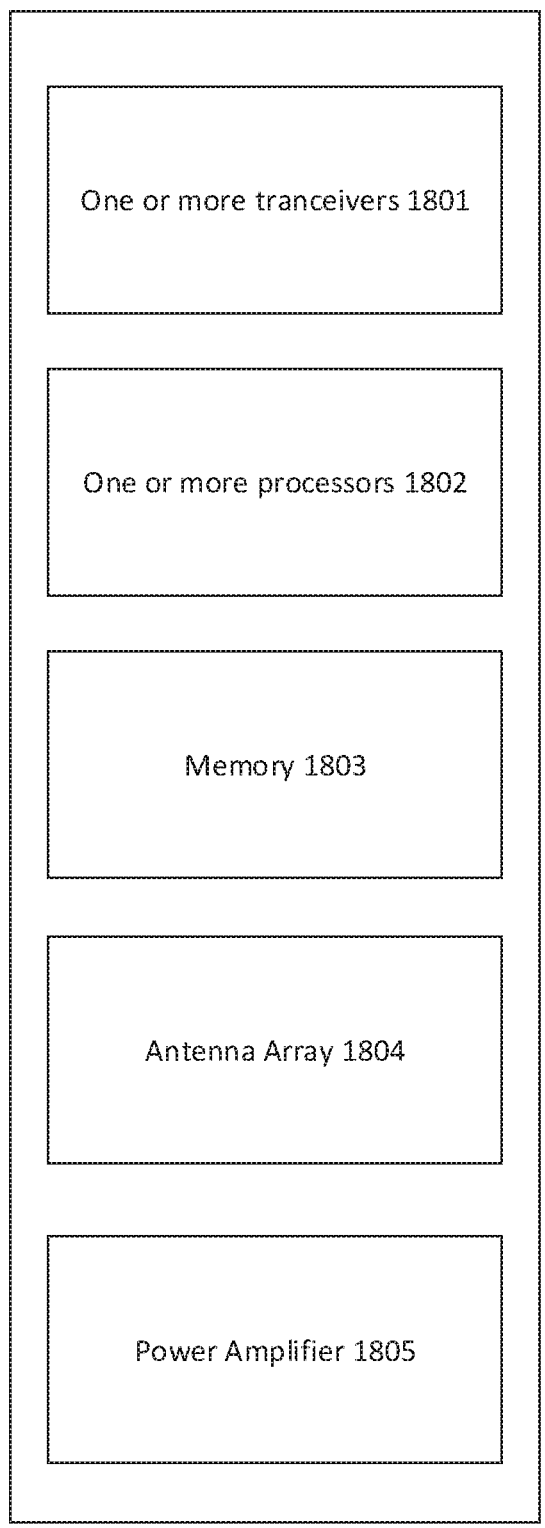
FIG. 18 shows a second device for beam estimation.

FIG. 18 shows a device for beamforming estimation, as computed by a user device, including one or more transceivers 1801, configured to receive a plurality of first-stage reference beams; and one or more processors 1802, configured to determine a first quality identifier and a second quality identifier, wherein the first quality identifier identifies a first-stage reference beam with a greatest received signal quality and the second quality identifier identifies a first-stage reference beam with a second greatest signal quality; and to determine a second-stage reference beam region based on the first quality identifier and the second quality identifier. The device for beamforming estimation may also comprise a memory 1803, configured to store at least one of a first-stage reference beam identifier; a first quality identifier; a second-stage reference beam region, or a second-stage reference beam identifier; an antenna array 1804, configured to receive an outbound signal from a power amplifier or to receive an inbound signal for delivery to the transceiver; and a power amplifier 1805, configured to receive the outbound signal from the transceiver, to amplify the outbound signal, and to deliver the amplified signal to the antenna array.

Figure 19:
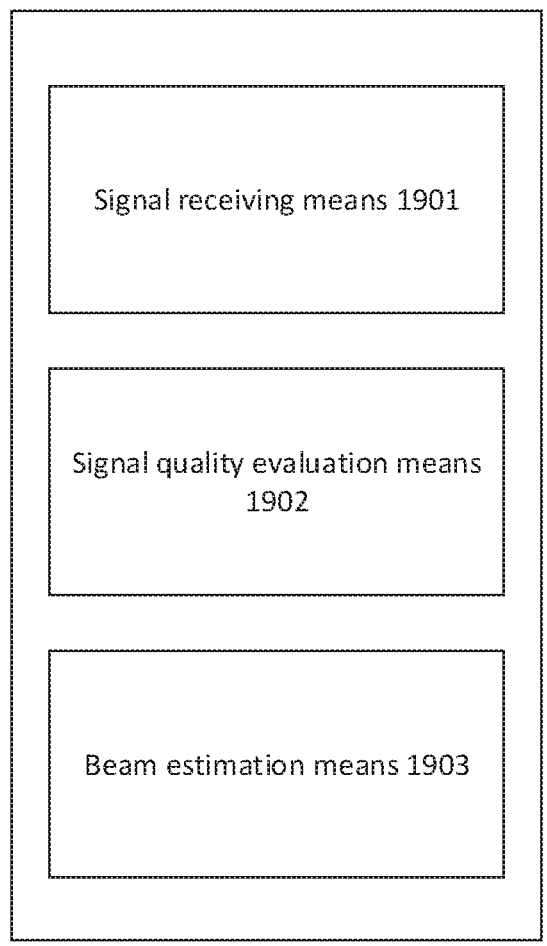
FIG. 19 shows a first means for performing beam estimation.

FIG. 19 shows a means for performing beamforming estimation including a receiving means 1901 configured to evaluate a signal quality of a first plurality of beamforming reference beams directed toward a first reference signal area; a signal quality evaluation means 1902 configured to select a subset of the first plurality of beamforming reference beams based on the signal quality, wherein the subset includes at least two beamforming reference beams; and a beam estimation means 1903 configured to determine a second reference signal area as a subset of the first reference signal area according to the subset of the first plurality of beamforming reference beams.

Figure 20:
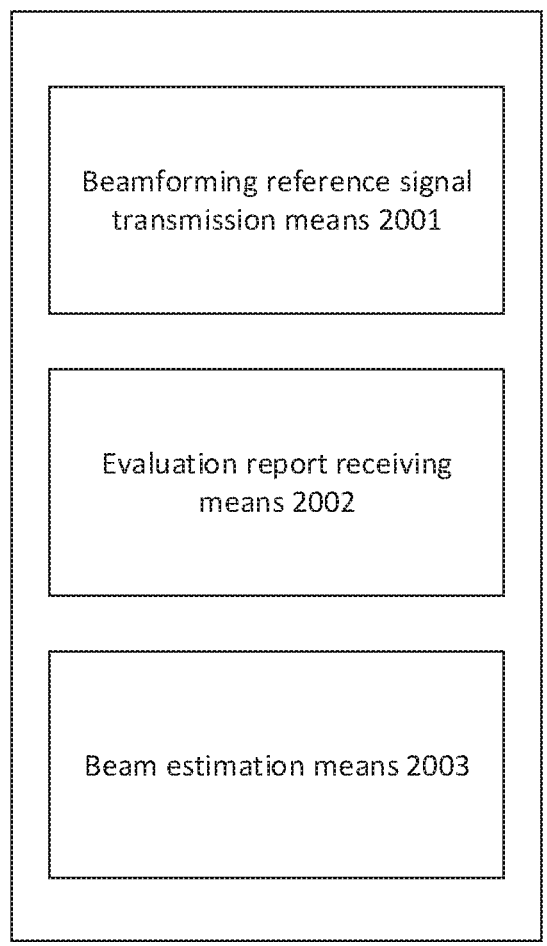
FIG. 20 shows a second means for performing beam estimation.

FIG. 20 shows a means for performing beamforming estimation including a beamforming reference signal transmission means 2001 configured to transmit a first plurality of beamforming reference beams directed toward a first reference signal area; an evaluation report receiving means 2002 configured to receive a beamforming reference beam transmission response identifying a plurality of beamforming reference beams according to a signal quality; and a beam estimation means 2003 configured to evaluate the beamforming reference beam transmission response according to a beam estimation algorithm; and determine a second reference signal area as a subset of the first reference signal area according to the evaluation of the beamforming reference beam transmission response.

Figure 21:
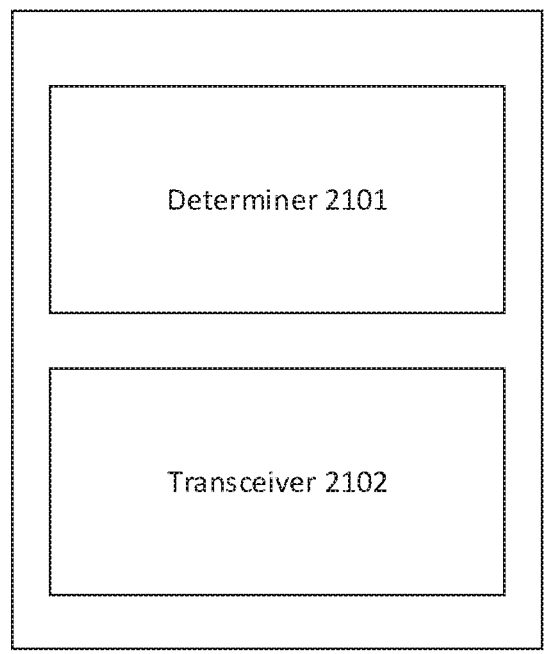
FIG. 21 shows a first device beam estimation.

FIG. 21 shows a device for beam estimation including one or more processors 2101, configured to allocate a first-stage region into a first plurality of sectors, each sector corresponding to a first-stage reference beam; and a transceiver 2102, configured to transmit the first-stage reference beams, and to receive a determination of a signal quality of a plurality of the first-stage reference beams; wherein the one or more processors determine a second-stage region from a plurality of the signal qualities.

Figure 22:
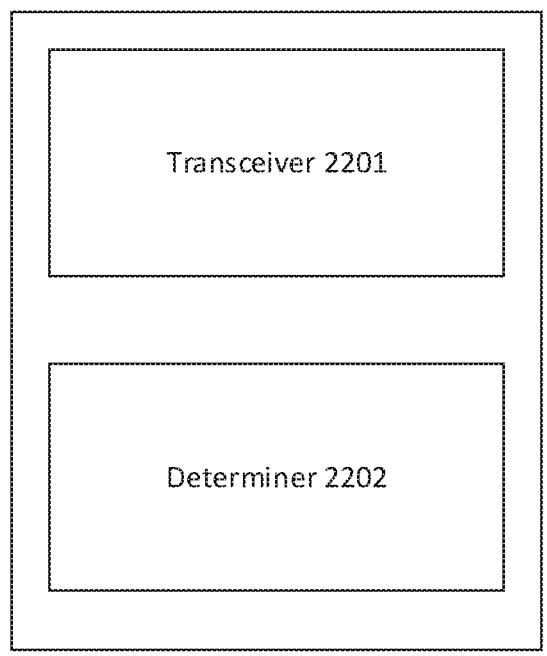
FIG. 22 shows a second device for beam estimation.

FIG. 22 shows a device for beam estimation including a transceiver 2201, configured to receive a plurality of first-stage beams; and one or more processors 2202, configured to determine a received signal quality of the plurality of the first-stage beams and to determine a second stage reference from a plurality of the received signal qualities.

Figure 23:
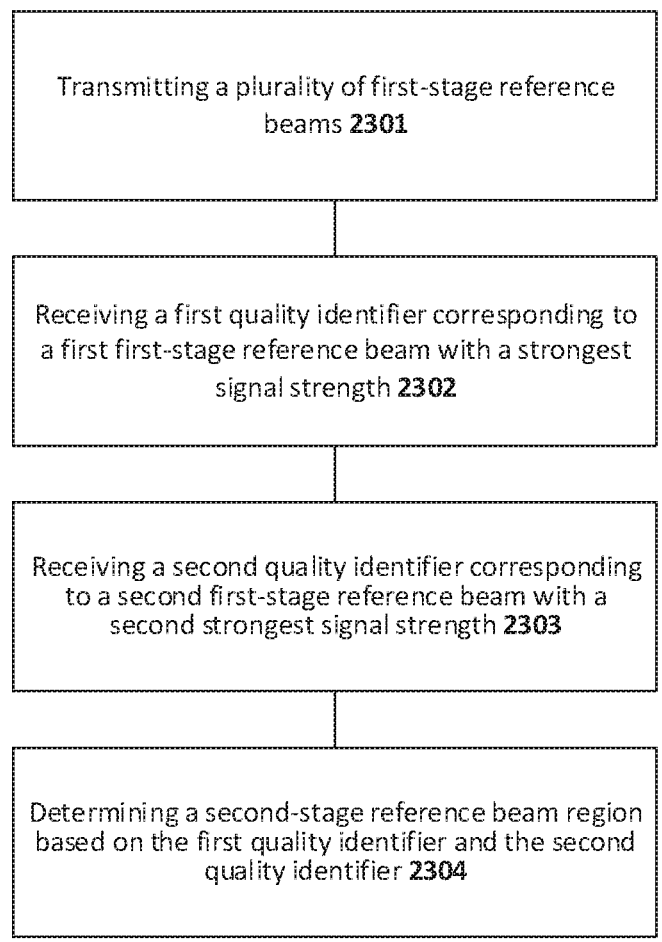
FIG. 23 shows a method for beam estimation.

FIG. 23 shows a method of beam estimation including transmitting a plurality of first-stage reference beams 2301; receiving a first quality identifier corresponding to a first first-stage reference beam with a strongest signal strength 2302; receiving a second quality identifier corresponding to a second first-stage reference beam with a second strongest signal strength 2303; and determining a second-stage reference beam region based on the first quality identifier and the second quality identifier 2304.

Figure 24:
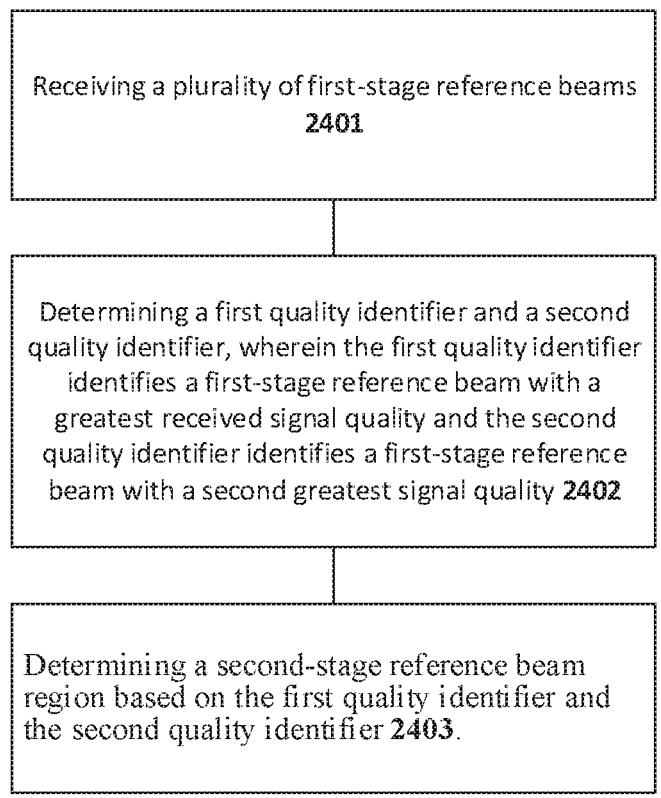
FIG. 24 shows a method for beam estimation.

FIG. 24 shows a method of beam estimation including receiving a plurality of first-stage reference beams 2401; determining a first quality identifier and a second quality identifier, wherein the first quality identifier identifies a first-stage reference beam with a greatest received signal quality and the second quality identifier identifies a first-stage reference beam with a second greatest signal quality 2402; and determining a second-stage reference beam region based on the first quality identifier and the second quality identifier 2403.

Conventionally, beam sweeping over a grid-of-beams has often been applied as a solution for beam acquisition. This grid-of-beams technique is known and will be readily understood by a person skilled in the art, and therefore it will not be recited in greater detail here. Nevertheless, beam sweeping achieves no better performance than a conventional beam scanner and is relatively inefficient, due at least to limited beam resolution and impact of sidelobe. An advanced beam estimation algorithm can allow for an in-depth understanding of beam sweeping results to the channel by providing improved beam resolution and reduced sidelobes, thereby making beam acquisition faster and more accurate. The current Different Direction of Arrival ("DoA") algorithms, such as MUltiple SIgnal Classication ("MUSIC"), Estimation of Signal Parameters Via Rotational Invariance Technique ("ESPRIT"), and compressive sensing, have only limited suitability for beam sweeping and provide inferior results.

As a general maxim, MIMO channels require at least 2K beam sweepings to acquire K beams. This novel beam estimation algorithm acquires K beam directions in a MIMO channel from the least number (i.e., 2K) of beam sweepings with low complexity and results in improved efficiency of beam acquisition.

For simplicity of explanation, it is assumed that the base station has a uniform linear array of N antennas, and the user device has only one antenna. Although the examples herein may operate under this simplified assumption, the methods and devices disclosed herein are applicable both to such simplified configurations, as well as MIMO systems including any additional number of antennas. Thus, the examples and descriptions included herein are not limited to the simplified examples used in the disclosure.

Four channel dimensions are typically used in beam acquisition: Zenith of Departure ("ZoD"), Azimuth of Departure ("AoD"), Zenith of Arrival ("ZoA") and Azimuth of Arrival ("AoA"), assuming both the base station and user device have a 2-D antenna array.

In a beam sweeping procedure, the base station employs M beams (typically of equal beam-width but pointing to different directions) to sweep the channel space with the goal of acquiring desirable beam directions. A simplified example of this procedure wherein M=4 is shown in FIG. 3. In this case, h is defined as the MIMO channel vector between base station and user device, and $b_m$ is defined as the mth sweeping beams, m=1, . . . M. Accordingly, the received beam gain at user device in beam sweeping by the m-th beam sweeping is expressed as:

$$y_m = h^H b_m + n_m \quad (6)$$

where $n_m$ is the receiver noise. Based on 3GPP channel modelling methodology, the MIMO channel vector is a sum of K paths as:

$$h = \Sigma_{k=1}^K a_k [1, e^{-j\mu_k}, \ldots, e^{-j(N-1)\mu_k}]^T \quad (7)$$

where $a_k$ and $$\mu_k = \frac{2\pi d \cos\varphi_k}{\lambda}$$

are the gain and direction of the k-th path in the channel, respectively, and N is the dimension of MIMO channel led by the size of antenna array. The parameter $\varphi_k$ is the scattering physical direction of the k-th path, and d is the antenna distance and λ is the wavelength of carrier.

DFT beams are widely used in beam sweeping, due to their constant modulus, ease of size expansion, and natural lending to the setting of uniform antenna array. The DFT beams have been used as codewords in 3GPP's channel state information ("CSI") acquisition procedure. A base station sends a beam reference signal by a DFT codeword in downlink:

$$b_m = [1, e^{-j\theta_m}, \ldots, e^{-j(N-1)\theta_m}] \quad (8)$$

where $$\theta_m = \frac{2\pi m}{N}, m \in \{1, \ldots N\}.$$

Correspondingly, assuming no noise, the user device receives a beamforming gain as:

$$y_m = h^H b_m \quad (9)$$

Beam estimation describes the estimation of beam directions, $\mu_k$, from beam gains, $y_m$. However, this requires consideration of at least two additional issues. It must be considered how to accurately estimate the K beam direction information $\mu_k$ from $y_m$, wherein:

$$\{\mu_k\} = \text{Beam Estimation}\{y_m\}, m=1, \ldots, M, k=1, \ldots, K \quad (10)$$

It must also be considered how many sweeping beams are needed at least to achieve an accurate estimation. Using the nomenclature otherwise disclosed herein, it is necessary to determine the smallest value of M to acquire all K values of $\mu_k$.

A novel algorithm of low complexity is herein disclosed, said algorithm permitting more accurate estimation of beam directions from beam gains while achieving said estimation using a fewest number of sweeping beams. Regarding the number of beams necessary, it is considered that, where a MIMO vector consists of K paths in a channel, the number of grid-of-DFT beam sweepings M necessary to acquire its K beams must be no smaller than 2K. This can be shown as follows.

As base station sweeps the channel by M DFT beams in downlink, the user device receives a number of M beamforming gains if no noise as:

$$y_m = h^H b_m = \Sigma_{k=1}^K \Sigma_{n=0}^{N-1} a_k e^{jn(\mu_k - \theta_m)}, m=1, \ldots M \quad (11)$$

There are a total of M equations, and 2K unknown variables, based on K variables of beam direction $\mu_k$ and K variables of path gain $a_k$, k=1, . . . , K. Accordingly, M must be no smaller than 2K to guarantee the ability to solve each the 2K variables. This indicates that the possible least value of M for acquiring K beams in the channel is M=2K. The relevant equations are nonlinear and of order N about the variable of beam direction $e^{j\mu_k}$. If N is large, based on a large antenna array size, these equations become increasingly difficult to solve using brute-force. Herein is disclosed a novel algorithm for beam estimation, and method and device for performing same, which aims to solve the problem acquiring K beams in a MIMO channel by using any 2K DFT beam sweepings. Without loss of generality, the 2K indices of DFT beam sweepings are denoted as $\{m_1, \ldots, m_{2K}\}$, as shown in FIG. 4.

The beamforming estimation begins with a transmission by the base station of a plurality of beamforming reference signals, and the subsequent reception by a user device of one or more of said beamforming reference signals. The base station sends beam reference signals by using a grid of transmission beams, e.g., $$b_m = [1, e^{j\theta_m}, \ldots, e^{j(N-1)\theta_m}]^T \quad (12)$$

and wherein $\theta_m = 2\pi m/N$, m belongs to a subset of $\{1, \ldots, M\}$. Upon the receipt of the one or more beamforming reference signals by the user device, the further beamforming calculations are performed based on 1 of 2 cases, as follows:

According to Case I, the beam estimation algorithm is performed by the user device. This requires that the codewords of the sweeping beams are known to the user device. A person skilled in the art will appreciate that, under certain implementations, the beamforming reference signals may be delivered in a particular order known to the user device, such that the user device can conclude a code word for a given beamforming reference signal received. Under these circumstances, the user device may, but need not, perform the beamforming estimation according to Case I. Where Case I is performed, the user device performs the beam sweeping algorithm, as demonstrated in FIG. 16, and reports the results of the beam sweeping algorithm to the base station.

Where the codewords of the sweeping beams are not known to the user device, the beam sweeping must be performed according to Case II. Further, Case II may be implemented, where desired, even where the sweeping beam codewords are in fact known to the user device. According to Case II, the user device analyzes the received sweeping beams to identify the 2K sweeping beams with the strongest signal strength. The user device then reports to the base station the 2K strongest beams from among the beamsweeping beams transmitted in the previous step.

The hybrid precoding for k number of user devices on a subcarrier f is given as ($1 \leq k \leq K$ and $1 \leq f \leq C$):

$$u_{f,k} = U_{AB} u_{DB,f,k} \quad (13)$$

Where $U_{AB}$ is the analog beamforming matrix of size N×L, $u_{DB,f,k}$ is the digital beamforming vector of L×1, and $K \leq L \leq N$. The analog beamforming matrix is wideband and implemented by phase shifters. The spatial channel vector between user device k and base station on subcarrier f is denoted as $h_{f,k}$ which is of size N×1.

The steps identified in FIG. 16 are further elucidated as follows.

In the first step (preprocessing), a constant for the $m_p$-th beam sweeping is defined as:

$$c_{m_p} = \frac{j e^{j \frac{N \theta_{m_p}}{2}}}{2(-1)^{m_p}} \quad (14)$$

By using the defined constants, the beam gain $y_{m_p}$ is transformed to $r_{m_p}$ by:

$$r_{m_p} = y_{m_p} c_{m_p} = \sum_{k=1}^{K} \frac{\tilde{a}_k}{1 - e^{j(\mu_k - \theta_{m_p})}} \quad (15)$$

where $$\tilde{a}_k = -a_k \sin\left(\frac{N \mu_k}{2}\right) e^{j \frac{N \mu_k}{2}} \quad (16)$$

In the second step (algorithm), the difference operation is used to define a new matrix D of size K×K and its (p, q)th element is defined as:

$$D_{p,q} = \frac{r_{m_p} - r_{m_{q+K}}}{e^{-j\theta_{m_p}} - e^{-j\theta_{m_{q+K}}}} \quad (17)$$

where p,q=1, . . . , K.

In the third step (sum matrix), the sum operation is used to define a new matrix S of size K×K, and its (p, q)th element as:

$$S_{p,q} = \frac{1}{2}\left(r_{m_p} + r_{m_{q+K}} + D_{p,q}\left(e^{-j\theta_{m_p}} + e^{-j\theta_{m_{q+K}}}\right)\right) \quad (18)$$

In the fourth step (Eigenvalue estimation), the acquired beam information is shown in the phases of the eigenvalues of constructed matrix $DS^{-1}$. After the previous three steps, the matrices D and S are subject to a unique matrix decomposition such that:

$$D = Z_1 R \Lambda Z_2 \quad (19)$$

$$S = Z_1 R Z_2 \quad (20)$$

where $$Z_1 = \begin{bmatrix} \frac{1}{1 - e^{j(\mu_1 - \theta_{m_1})}} & \cdots & \frac{1}{1 - e^{j(\mu_K - \theta_{m_1})}} \\ \vdots & \ddots & \vdots \\ \frac{1}{1 - e^{j(\mu_1 - \theta_{m_K})}} & \cdots & \frac{1}{1 - e^{j(\mu_K - \theta_{m_K})}} \end{bmatrix} \quad (20)$$

$$Z_2 = \begin{bmatrix} \frac{1}{1 - e^{j(\mu_1 - \theta_{m_{K+1}})}} & \cdots & \frac{1}{1 - e^{j(\mu_K - \theta_{m_{K+1}})}} \\ \vdots & \ddots & \vdots \\ \frac{1}{1 - e^{j(\mu_1 - \theta_{m_{2K}})}} & \cdots & \frac{1}{1 - e^{j(\mu_K - \theta_{m_{2K}})}} \end{bmatrix} \quad (22)$$

$$R = \begin{bmatrix} \tilde{a}_1 & \cdots & 0 \\ \vdots & \ddots & \vdots \\ 0 & \cdots & \tilde{a}_K \end{bmatrix} \quad (23)$$

$$\Lambda = \begin{bmatrix} e^{j\mu_1} & \cdots & 0 \\ \vdots & \ddots & \vdots \\ 0 & \cdots & e^{j\mu_K} \end{bmatrix} \quad (24)$$

Such that for any constant γ, $$D - \gamma S = Z_1 \Lambda [\Phi - \gamma I] Z_2 \quad (25)$$

and $$\det|D - \gamma S| = 0 \text{ if } \gamma = e^{j\mu_k} \quad (26)$$

Using this property, the problem of acquiring K beams from 2K DFT beam sweepings can be solved by an eigenvalue estimation problem, such as:

$$e^{j\mu_k} = \text{eigenvalue}(DS^{-1}) \quad (27)$$

The complexity of beam estimation is approximately $K^3$, which arises primarily from the contribution of the eigenvalue decomposition to the size K×K matrix $DS^{-1}$.

After completion of the beam estimation algorithm, the beam information must be reported to the base station. The exact nature of this information depends on whether Case I or Case II was carried out in the algorithm step. Where Case I was performed, the user device reports to the base station with the estimation result of the beam information according to the beam estimation algorithm. Where Case II was performed, the user device reports to the base station the first 2K strongest beam gains.

After completion of the beam information reporting, the next beam set must be determined. The base station optimizes the second stage beam set by using the beam estimation result, regardless of whether the beam estimation result is created by the base station or the user device. Having obtained the beam estimation result, multiple strategies may be used to select the next-stage beam determination set. According to one aspect of the disclosure, the beam estimation result is selected as the center of the beam set for the next stage of beam sweeping. The region of the next stage of beam sweeping according to this aspect considers not just the best-selected beam in the first-stage, but also at least a second-best selected beam, and the next-stage region is shifted compared to a hypothetical region that would have been selected according to the best selection method.

Performance Evaluation of Algorithm

The metric of analog beamforming gain loss is defined by:

$$\text{Gain Loss} = 1 - \frac{[1, e^{-j\hat{\mu}}, \ldots, e^{-j(N-1)\hat{\mu}}][1, e^{-j\mu}, \ldots, e^{-j(N-1)\mu}]^H}{N} \quad (28)$$

where $\mu$ means the true beam information, and $\hat{\mu}$ means the acquired beam information, and the antenna array is set as N=16. When $\hat{\mu}=\mu$, the analog gain loss is zero.

The simulated channel is such that each channel realization consists of two scattering clusters. The term "cluster" is also referred as "path" in time domain. The clusters are randomly distributed in the space within −60°, 60° with respect to the broadside of the antenna array at the base station. The cluster gains are randomly distributed in a log-normal way, and each cluster has 20 rays (known as "sub-paths" in time domain) with small random angle.

The beam estimation algorithm and method disclosed herein is an improvement over legacy beam sweeping. There are at least two drawbacks to the known multi-stage beam sweeping scheme: limited beam resolution and existing of sidelobe. The methods and devices disclosed herein avoid these principal drawbacks.

To show how the beam estimation impacts the conventional beam sweeping scheme, this use case considers a two-stage beam sweeping scheme with two-level DFT beams are shown in FIG. 9. In this figure, there are four broad DFT beams (level 1) in stage-1, and each broad beam in stage-1 is associated with 4 narrow beams (level 2) in stage-2.

Flexible Beam Set in Next-Stage Beamsweeping

FIG. 9 shows a channel of two paths, and there are two beam directions to acquire. After sweeping by 4 stage-1 beams, this technique determines that the second broad beam has the largest beam gain. Then in multi-stage beam sweeping, the four narrow beams corresponding to the broad beam 2 will be swept.

In stage-2, sweeping beams become narrow, and the beam resolution is thus increased, which gives a different view of the MIMO channel. It is found that there are actually two peaks shown in improved beam resolution, as depicted in FIG. 10, and the highest peak unfortunately have moved out of the scope to be swept.

In contrast, by applying the determined beam estimation algorithm to the beam sweeping result in stage-1, an estimate of two beam directions can be obtained. Then the set of sweeping beams in stage-2 can be shifted a little bit, from the sweeping range indicated by black dashed block to blue real line block. Then the highest peak will not be missed. Therefore, it means the determined beam estimation algorithm can make more flexible beam sweeping in next-stage.

In FIG. 11, there are two well-separated paths. Accordingly, in the first stage beam estimation, the mechanism finds two strongest beam gains. In conventional multi-stage beam sweeping scheme, each of broad beam is further swept by four narrow beams in the second stage, as shown in FIG. 11. Then in total, eight narrow beams are swept in the second stage.

In contrast, the beam estimation can give an estimation of locations of two paths, and then only two beams of intermediate beam width are swept in the second stage for each path. In this case, the discarded beam gains in the first stage become useful information for the beam estimation. The improved beam resolution is not directly led by densifying sweeping beams (level 2 only uses 8 DFT beams instead of 16 DFT beams). This case shows that the beam estimation algorithm can perform a compact beam sweeping set in the next-stage.

According to one aspect of the disclosure, the novel beam estimation algorithm allows for beam acquisition, including a K continuously-valued beam information, from as few as 2K DFT beam sweepings. This permits beam acquisition using the fewest number of beam sweepings.

When working with multi-stage beam sweeping schemes, the determined beam estimation algorithm can be applied to optimize beamsweeping set in a next stage. It helps reducing the chances of missing potential paths caused by limited beam resolution, and also by reducing the chances of falsely detecting spurious paths caused by nontrivial side-lobes in sweeping results. The beam sweeping set can be thus made more flexible and more compact, and accordingly, the efficiency of beam acquisition is improved.

According to one aspect of the disclosure, the beam estimation algorithm may be performed by the user device. This configuration requires that the user device be aware of the beamforming code words used for the beamforming reference beams received by the user device. This may occur where, for example, the beamforming reference beams are transmitted in a specific order or in accordance with a specific series of beamforming code words. Regardless of the configuration, where the user device knows or is able to determine the corresponding beamforming code words, the user device may perform the beam estimation algorithm as described herein.

Where the user device performs the beam estimation algorithm, the user device performs a method of beam estimation including receiving a first plurality of beamforming reference beams directed toward a first reference signal area; evaluating a signal quality of the first plurality of beamforming reference beams; selecting a subset of the first plurality of beamforming reference beams based on the signal quality, wherein the subset includes at least two beamforming reference beams; and determining a second reference signal area as a subset of the first reference signal area according to the subset of the first plurality of beamforming reference beams.

Upon receiving the beamforming reference beams, the user device selects a subset of the beamforming reference beams based on a signal quality. According to one aspect of the disclosure, the signal quality may be a signal strength. According to another aspect of the disclosure, the subset may include the two beamforming reference beams received with the highest signal strength. Where the user device performs the beam estimation algorithm, the user device will assess the beams within the subset in accordance with the beam estimation algorithm described herein. This requires performing the four stages of the beam estimation algorithm shown on FIG. 16: preprocessing, difference matrix, some matrix, and eigenvalue estimation. The result of this beam estimation algorithm provides a region for a plurality of second stage beamforming reference beams. This second region will generally encompass a portion of the region corresponding to the first stage reference beam with the highest signal strength and a portion of the region corresponding to the first stage beamforming reference beam with the second highest signal strength. This provides a benefit over the conventional method of multistage beam estimation, where second stage beams are directed toward an area represented by a first stage beam with a great is signal strength, which can result in second stage beams not being directed in a desirable area.

As described herein, the beam estimation is performed using at least two stages. In the first stage, a plurality of beamforming reference beams are transmitted at a first gain, wherein the first gain is a relatively wide gain. In the second stage, a plurality of beamforming reference beams are transmitted at a second gain, wherein the second gain is smaller than the first gain. This enables a narrowing or focusing of the beamforming reference beams in the second stage to a smaller area, and therefore better allows the identification were pinpointing of the relevant antenna. According to one aspect of the disclosure, beam estimation may conclude after completion of the first stage and the second stage. According to another aspect of the disclosure, beam estimation may continue through three or more stages, wherein each stage successively narrows the beamforming reference beam area, and where each stage involves transmission of beamforming reference beams with a narrower gain than the previous stage.

As stated herein, the signal quality on which the beamforming reference beams are evaluated and grouped into a subset may be a signal strength. Alternatively, the reference beams may be assessed based on signal to noise ratio.

In some configurations, the user device may not be aware of the codebook entries for the beamforming reference beams, and therefore the user device may be unable to perform the beam estimation algorithm. Under these circumstances, the user device receives a first stage of beamforming reference beams and evaluates said beams according to the signal quality as described herein. The signal quality evaluation is used to determine a subset of beamforming reference beams, which, according to one aspect of the disclosure, is a subset of 2 beamforming reference beams. Upon determining the subset, the user device transmits the subset to the base station, which then performs the beam estimation algorithm. By virtue of having transmitted the first stage beamforming reference beams, the base station is aware of the corresponding codebook entries, and therefore the base station may always be able to perform the beam estimation algorithm. Where the base station performs the beam estimation algorithm, this algorithm is performed in accordance with the steps described in FIG. 16: preprocessing, difference matrix, some matrix, and eigenvalue estimation. Upon completion of the beam estimation algorithm, the base station has calculated an area for a next stage of beamforming reference beams, where in the area corresponds at least to a portion of an area from a prior stage beamforming reference beam with a highest signal quality and a portion of an area from a prior stage beamforming reference beam with a second highest signal quality.

Where the base station performs the beam estimation algorithm, the base station transmits a first plurality of beamforming reference beams directed toward a first reference signal area; receives a beamforming reference beam transmission response identifying a plurality of beamforming reference beams according to a signal strength; evaluates the beamforming reference beam transmission response according to a beam estimation algorithm; and determines a second reference signal area as a subset of the first reference signal area according to the evaluation of the beamforming reference beam transmission response.

Where the user device performs the beam estimation algorithm, the user device may include a transceiver, configured to receive a first plurality of beamforming reference beams directed toward a first reference signal area; a controller, configured to evaluate a signal quality of the first plurality of beamforming reference beams; select a subset including at least two of the first plurality of beamforming reference beams based on the signal quality; and determine a second reference signal area as a subset of the first reference signal area according to the subset; and a memory, configured to store the subset.

Where the base station performs the beam estimation algorithm, the base station may include a transceiver, configured to transmit a first plurality of beamforming reference beams directed toward a first reference signal area; and to receive a beamforming reference beam transmission response identifying a plurality of beamforming reference beams according to a signal strength; a memory, configured to store the received beamforming reference beam transmission response; a controller, configured to evaluate the beamforming reference beam transmission response according to a beam estimation algorithm; and to determine a second reference signal area as a subset of the first reference signal area according to the evaluation of the beamforming reference beam transmission response.

It is disclosed herein that a user device may perform the beam estimation algorithm, the result of which will be the second-stage reference. The user device may transmit the second-stage reference to the base station, which will then use the second-stage reference to create a second-stage reference beam region. Alternatively, the user device may use the second-stage reference to create the second-stage reference beam region.

The methods described herein may be performed by machine-readable storage, including machine-readable instructions configured to cause a computer or processor to perform the beam estimation algorithm. This machine-readable storage may be non-transient.

According to one aspect of the disclosure, non-transient machine-readable storage may contain instructions to cause a computer or processor to perform any method described herein.

The following examples apply to various aspects of the Disclosure:

In example 1, a device for beam estimation is disclosed, including:
One or more processors, configured to allocate a first-stage region into a first plurality of sectors, each sector corresponding to a first-stage reference beam;
a transceiver, configured to transmit the first-stage reference beams, and to receive a determination of a signal quality of a plurality of the first-stage reference beams; wherein the one or more processors determine a second-stage region from a plurality of the signal qualities.

In example 2, the device of example 1 is disclosed, wherein the plurality of first-stage reference beams corresponds to a plurality of beamforming reference beams.

In example 3, the device of example 1 or 2 is disclosed, wherein the signal quality is a received signal strength.

In example 4, the device of any one of examples 1 to 3 is disclosed, further including the one or more processors allocating the second-stage region into a plurality of sectors.

In example 5, the device of example 4 is disclosed, wherein the plurality of sectors for the second-stage region correspond to a plurality of second-stage reference beams.

In example 6, the device of example 5 is disclosed, wherein a gain of the second-stage reference beams is smaller than a gain of the first-stage reference beams.

In example 7, the device of any one of examples 1 to 6 is disclosed, wherein the second-stage region includes a portion of a first sector and a portion of a second sector from the first plurality of sectors.

In example 8, the device of any one of examples 1 to 7 is disclosed, wherein the device is a base station.

In example 9, the device of any one of examples 1 to 8 is disclosed, wherein the device is an eNodeB.

In example 10, the device of any one of examples 1 to 9 is disclosed, wherein the device is configured to operate on a radio access network.

In example 11, the device of example 10 is disclosed, wherein the radio access network is an LTE network.

In example 12, the device of example 10 is disclosed, wherein the radio access network is an 5G network.

In example 13, a device for beam estimation is disclosed, including:
a transceiver, configured to receive a plurality of first-stage beams; and
one or more processors, configured to determine a received signal quality of the plurality of the first-stage beams and to determine a second stage reference from a plurality of the received signal qualities.

In example 14, the device of example 13 is disclosed, wherein the plurality of first-stage beams corresponds to a plurality of beamforming reference beams.

In example 15, the device of example 13 or 14 is disclosed, wherein the signal quality is a received signal strength.

In example 16, the device of any one of examples 13 to 15 is disclosed, further including the transceiver transmitting the second stage reference.

In example 17, the device of any one of examples 13 to 15 is disclosed, further including the one or more processors defining a second-stage region according to the second stage reference.

In example 18, the device of example 17 is disclosed, further including the one or more processors allocating the second-stage region into a plurality of sectors.

In example 19, the device of example 18 is disclosed, wherein the plurality of sectors for the second-stage region correspond to a plurality of second-stage reference beams.

In example 20, the device of example 19 is disclosed, wherein a gain of the second-stage reference beams is smaller than a gain of the first-stage reference beams.

In example 21, the device of any one of examples 13 to 20 is disclosed, wherein the second-stage region includes a portion of a first sector and a portion of a second sector from the first plurality of sectors.

In example 22, the device of any one of examples 13 to 21 is disclosed, wherein the first-stage beams are sent by a base station.

In example 23, the device of any one of examples 13 to 22 is disclosed, wherein the device is a user device.

In example 24, the device of any one of examples 13 to 22 is disclosed, wherein the device is a user equipment.

In example 25, the device of any one of examples 23 to 24 is disclosed, wherein the device is configured to operate on a radio access network.

In example 26, the device of example 25 is disclosed, wherein the radio access network is an LTE network.

In example 27, the device of example 25 is disclosed, wherein the radio access network is an 5G network.

In example 28, a method of beam estimation is disclosed, including:
allocating a first-stage region into a first plurality of sectors, the first plurality of sectors corresponding to a plurality of first-stage beams;
determining a signal quality of a plurality of the first-stage beams; and
determining a second-stage region from a plurality of the received signal qualities.

In example 29, the method of example 28 is disclosed, wherein the first plurality of sectors corresponds to a plurality of beamforming reference beams.

In example 30, the method of example 28 or 29 is disclosed, wherein the signal quality is a received signal strength.

In example 31, the method of any one of examples 28 to 30 is disclosed, wherein the second stage-region further includes a second plurality of sectors.

In example 32, the method of example 31 is disclosed, wherein at least one of the second plurality of sectors corresponds to a beamforming reference.

In example 33, the method of any one of examples 28 to 32 is disclosed, wherein the second-stage region includes a portion of a first sector and a portion of a second sector from the first plurality of sectors.

In example 34, the method of any one of examples 28 to 33 is disclosed, wherein the first-stage beams are sent by a base station.

In example 35, the method of any one of examples 28 to 34 is disclosed, wherein the base station defines the second-stage region according to a plurality of the received signal qualities.

In example 36, the method of any one of examples 28 to 35 is disclosed, wherein a user device defines the second-stage region according to a plurality of the received signal qualities.

In example 37, the method of any one of examples 28 to 36 is disclosed, wherein a gain of the first-stage beams is greater than a gain of the second-stage beams.

In example 38, the method of any one of examples 28 to 37 is disclosed, further including defining a plurality of second-stage regions, at least two second-stage regions being non-adjacent, based at least on a distance between the plurality of the received signal qualities.

In example 39, a means of beam estimation is disclosed, including (user device computes):
a region allocation means, configured to allocate a first-stage region into a first plurality of sectors, the first plurality of sectors corresponding to a plurality of first-stage beams;
a signal quality measurement means, configured to determine a signal quality of a plurality of the first-stage beams; and
a region derivation means, configured to determine a second-stage region from a plurality of the received signal qualities.

In example 40, a non-transient machine-readable storage including machine-readable instructions is disclosed, configured to:
allocate a first-stage region into a first plurality of sectors, the first plurality of sectors corresponding to a plurality of first-stage beams;
determine a signal quality of a plurality of the first-stage beams; and
determine a second-stage region from a plurality of the received signal qualities.

In example 41, machine-readable storage including machine-readable instructions, when executed, to implement a method or realize an apparatus as claimed in any preceding claim are disclosed.

In example 42, a method of beam estimation is disclosed, including (user device computes):
receiving a first plurality of beamforming reference beams directed toward a first reference signal area;
evaluating a signal quality of the first plurality of beamforming reference beams;
selecting a subset of the first plurality of beamforming reference beams based on the signal quality is disclosed, wherein the subset includes at least two beamforming reference beams;

determining a signal index for a plurality of beams within the subset of the first plurality of reference beams; and calculating a second reference signal area as a subset of the first reference signal area according to the signal index of a plurality of beams within the subset.

In example 43, the method of example 42 is disclosed, wherein each of the first plurality of beamforming reference beams is directed in a different direction.

In example 44, the method of example 42 or 43 is disclosed, wherein the first reference signal area includes a combined region of the first plurality of beamforming reference beams.

In example 45, the method of any one of examples 42 to 44 is disclosed, wherein the first plurality of beamforming reference beams corresponds to a plurality of beamforming codebook entries, and wherein the codebook entries are known to a device receiving the first plurality of beamforming reference beams.

In example 46, the method of example 45 is disclosed, wherein the subset is selected based on the signal quality and the beamforming codebook entries.

In example 47, the method of any one of examples 42 to 46 is disclosed, wherein the determination of the second reference signal area is performed with a beam estimation algorithm according to the subset of the first plurality of beamforming reference beams.

In example 48, the method of any one of examples 42 to 47 is disclosed, wherein the second reference signal area includes a portion of the area corresponding to a first beamforming reference beam and the second corresponding to a second beamforming reference beam within the subset of the first plurality of beamforming reference beams.

In example 49, the method of any one of examples 42 to 48 is disclosed, wherein the subset of the first plurality of beamforming reference beams includes two beamforming reference beams.

In example 50, the method of any one of examples 42 to 49 is disclosed, further including evaluating a signal quality of a second plurality of beamforming reference beams directed toward the second reference signal area.

In example 51, the method of any one of examples 42 to 50 is disclosed, wherein the first plurality of beamforming reference beams are set for a first gain, and wherein the second plurality of beamforming reference beams are set for a second gain.

In example 52, the method of any one of examples 42 to 51 is disclosed, wherein the first gain is greater than the second gain.

In example 53, the method of any one of examples 42 to 52 is disclosed, wherein the signal quality is a signal strength.

In example 54, the method of any one of examples 42 to 53 is disclosed, wherein the signal quality is a signal to noise ratio.

In example 55, a method of beamforming estimation including (BS computes) is disclosed including:
Transmitting a first plurality of beamforming reference beams directed toward a first reference signal area;
Receiving a beamforming reference beam transmission response identifying a plurality of beamforming reference beams according to a signal strength;
Evaluating the beamforming reference beam transmission response according to a beam estimation algorithm; and
determining a second reference signal area as a subset of the first reference signal area according to the evaluation of the beamforming reference beam transmission response.

In example 56, the method of example 55 is disclosed, further including transmitting a second plurality of beamforming reference beams directed toward the second reference signal area.

In example 57, the method of example 55 or 56 is disclosed, wherein the second plurality of beamforming reference beams is four beams.

In example 58, the method of any one of examples 55 to 57 is disclosed, wherein the second reference signal area includes a portion of two beamforming reference beams within the subset of the first plurality of beamforming reference beams.

In example 59, the method of any one of examples 55 to 58 is disclosed, further including receiving a second beamforming reference beam transmission response evaluating a signal quality of a second plurality of beamforming reference beams directed toward the second reference signal area.

In example 60, the method of any one of examples 55 to 59 is disclosed, wherein the first plurality of beamforming reference beams have a first gain, and wherein the second plurality of beamforming reference beams have a second gain.

In example 61, the method of any one of examples 55 to 60 is disclosed, wherein the first gain is greater than the second gain.

In example 62, the method of any one of examples 55 to 61 is disclosed, wherein the beamforming reference beam transmission response identifies two of the plurality of beamforming reference beams with a strongest signal strength as received by a user device.

In example 63, the method of any one of examples 55 to 62 is disclosed, wherein the second reference signal area includes a first area corresponding to the beamforming reference beam with the strongest signal strength and a second area corresponding to the beamforming reference beam with the second strongest signal strength.

In example 64, the method of any one of examples 55 to 63 is disclosed, wherein the signal quality is a signal strength.

In example 65, the method of any one of examples 55 to 64 is disclosed, wherein the signal quality is a signal to noise ratio.

In example 66, a device for beamforming estimation is disclosed including (UD computes):
a transceiver, configured to receive a first plurality of beamforming reference beams directed toward a first reference signal area;
a controller, configured to evaluate a signal quality of the first plurality of beamforming reference beams; select a subset including at least two of the first plurality of beamforming reference beams based on the signal quality; and determine a second reference signal area as a subset of the first reference signal area according to the subset; and
a memory, configured to store the subset.

In example 67, the device of example 66 is disclosed, wherein the first plurality of beamforming reference beams corresponds to a plurality of beamforming codebook entries, and wherein the codebook entries are known to a device receiving the first plurality of beamforming reference beams.

In example 68, the device of example 66 or 67 is disclosed, wherein the determination of the second reference signal area is performed with a beam estimation algorithm according to the subset of the first plurality of beamforming reference beams.

In example 69, the device of any one of examples 66 to 68 is disclosed, wherein the second reference signal area includes a portion of the area corresponding to a first beamforming reference beam and the second corresponding to a second beamforming reference beam within the subset of the first plurality of beamforming reference beams.

In example 70, the device of any one of examples 66 to 69 is disclosed, wherein the subset of the first plurality of beamforming reference beams includes two beamforming reference beams.

In example 71, the device of any one of examples 66 to 70 is disclosed, further including evaluating a signal quality of a second plurality of beamforming reference beams directed toward the second reference signal area.

In example 72, the device of any one of examples 66 to 71 is disclosed, wherein the first plurality of beamforming reference beams are set for a first gain, and wherein the second plurality of beamforming reference beams are set for a second gain.

In example 73, the device of any one of examples 66 to 72 is disclosed, wherein the first gain is greater than the second gain.

In example 74, the device of any one of examples 66 to 73 is disclosed, wherein the signal quality is a signal strength.

In example 75, the device of any one of examples 66 to 74 is disclosed, wherein the signal quality is a signal to noise ratio.

In example 76, a device for beamforming estimation is disclosed including (BS Computes):
a transceiver, configured to transmit a first plurality of beamforming reference beams directed toward a first reference signal area; and to receive a beamforming reference beam transmission response identifying a plurality of beamforming reference beams according to a signal strength;
a memory, configured to store the received beamforming reference beam transmission response;
a controller, configured to evaluate the beamforming reference beam transmission response according to a beam estimation algorithm; and to determine a second reference signal area as a subset of the first reference signal area according to the evaluation of the beamforming reference beam transmission response.

In example 77, the device of example 76 is disclosed wherein the first plurality of beamforming reference beams corresponds to a plurality of beamforming codebook entries.

In example 78, the device of example 76 or 77 is disclosed, wherein the determination of the second reference signal area is performed with a beam estimation algorithm according to the subset of the first plurality of beamforming reference beams.

In example 79, the device of any one of examples 76 to 78 is disclosed, wherein the second reference signal area includes a portion of the area corresponding to a first beamforming reference beam and the second corresponding to a second beamforming reference beam within the subset of the first plurality of beamforming reference beams.

In example 80, the device of any one of examples 76 to 79 is disclosed, wherein the subset of the first plurality of beamforming reference beams includes two beamforming reference beams.

In example 81, the device of any one of examples 76 to 80 is disclosed, further including evaluating a signal quality of a second plurality of beamforming reference beams directed toward the second reference signal area.

In example 82, the device of any one of examples 76 to 81 is disclosed, wherein the first plurality of beamforming reference beams are set for a first gain, and wherein the second plurality of beamforming reference beams are set for a second gain.

In example 83, the device of any one of examples 76 to 82 is disclosed, wherein the first gain is greater than the second gain.

In example 84, the device of any one of examples 76 to 83 is disclosed, wherein the signal quality is a signal strength.

In example 85, the device of any one of examples 76 to 84 is disclosed, wherein the signal quality is a signal to noise ratio.

In example 86, a means of beam estimation is disclosed including (user device computes): a signal receiving means, configured to receive a first plurality of beamforming reference beams directed toward a first reference signal area; a signal quality evaluation means configured to evaluate a signal quality of the first plurality of beamforming reference beams; and a beam estimation means, configured to select a subset of the first plurality of beamforming reference beams based on the signal quality is disclosed, wherein the subset includes at least two beamforming reference beams; and to determine a second reference signal area as a subset of the first reference signal area according to the subset of the first plurality of beamforming reference beams.

In example 87, a means of beam estimation is disclosed including (user device computes): a beamforming reference signal receiving means, configured to transmit a first plurality of beamforming reference beams directed toward a first reference signal area; an evaluation report receiving means, configured to receive a beamforming reference beam transmission response identifying a plurality of beamforming reference beams according to a signal strength; a beam estimation means, configured to evaluate the beamforming reference beam transmission response according to a beam estimation algorithm; and to determine a second reference signal area as a subset of the first reference signal area according to the evaluation of the beamforming reference beam transmission response.

In example 88, a non-transient machine-readable storage including machine-readable instructions is disclosed, said storage being configured to:
receive a first plurality of beamforming reference beams directed toward a first reference signal area; evaluate a signal quality of the first plurality of beamforming reference beams;
select a subset of the first plurality of beamforming reference beams based on the signal quality is disclosed, wherein the subset includes at least two beamforming reference beams; and determine a second reference signal area as a subset of the first reference signal area according to the subset of the first plurality of beamforming reference beams.

In example 89, a non-transient machine-readable storage including machine-readable instructions is disclosed, said storage being configured to: transmit a first plurality of beamforming reference beams directed toward a first reference signal area; receive a beamforming reference beam transmission response identifying a plurality of beamforming reference beams according to a signal strength; evaluate the beamforming reference beam transmission response according to a beam estimation algorithm; and determine a second reference signal area as a subset of the first reference signal area according to the evaluation of the beamforming reference beam transmission response.

In example 90, a Machine-readable storage including machine-readable instructions is disclosed that, when executed, to implement a method or realize an apparatus as claimed in any preceding claim.

In Example 91, a beam estimation system is disclosed comprising:
one or more transceivers, configured to transmit a plurality of first-stage reference beams, and to receive a first quality identifier corresponding to a first first-stage reference beam with a strongest signal strength and a second quality identifier corresponding to a second first-stage reference beam with a second strongest signal strength; and
one or more processors, configured to determine a second-stage reference beam region based on the first quality identifier and the second quality identifier.

In Example 91, a beam estimation system is disclosed comprising:
one or more transceivers, configured to receive a plurality of first-stage reference beams; and one or more processors, configured to determine a first quality identifier and a second quality identifier, wherein the first quality identifier identifies a first-stage reference beam with a greatest received signal quality and the second quality identifier identifies a first-stage reference beam with a second greatest signal quality; and to determine a second-stage reference beam region based on the first quality identifier and the second quality identifier.

In Example 92, the beam estimation system of example 90 or 91 is disclosed, further comprising a memory, configured to store at least one of a first-stage reference beam identifier; a first quality identifier; a second-stage reference beam region, or a second-stage reference beam identifier; an antenna array, configured to receive from a power amplifier an outbound signal comprising the plurality of first-stage reference beams and to receive an inbound signal comprising the first quality identifier and the second quality identifier, and to deliver the inbound signal to the transceiver; and a power amplifier, configured to receive from the one or more processors the outbound signal, to amplify the outbound signal, and to deliver an amplified outbound signal to the antenna array.

In Example 93, the beam estimation system of example 90 or 91 is disclosed, wherein the first quality identifier and the second quality identifiers are received signal strength indicators.

In Example 94, the beam estimation system of example 90 or 91 is disclosed, wherein the first quality identifier and the second quality identifiers are Reference Signal Strength Indicators (RSSI).

In Example 95, the beam estimation system of example 90 or 91 is disclosed, wherein the first quality identifier and the second quality identifiers are Signal to Noise Ratio.

In Example 96, the beam estimation system of example 90 or 91 is disclosed, wherein the second-stage reference beam region comprises a region corresponding to the first quality identifier and a region corresponding to the second quality identifier.

In Example 97, the beam estimation system of example 96 is disclosed, wherein a gain of the second-stage reference beams is smaller than a gain of the first-stage reference beams.

In Example 98, the beam estimation system of example 90 or 91 is disclosed, further comprising the one or more processors being configured to allocate the second-stage reference beam region into a plurality of sectors.

In Example 99, the beam estimation system of example 98 is disclosed, wherein the plurality of sectors for the second-stage reference beam region corresponds to a plurality of second-stage reference beams.

In Example 100, a beam estimation method is disclosed comprising:
transmitting a plurality of first-stage reference beams;
receiving a first quality identifier corresponding to a first first-stage reference beam with a strongest signal strength;
receiving a second quality identifier corresponding to a second first-stage reference beam with a second strongest signal strength; and
determining a second-stage reference beam region based on the first quality identifier and the second quality identifier.

In Example 101, a beam estimation method is disclosed comprising:
receiving a plurality of first-stage reference beams;
determining a first quality identifier and a second quality identifier, wherein the first quality identifier identifies a first-stage reference beam with a greatest received signal quality and the second quality identifier identifies a first-stage reference beam with a second greatest signal quality; and determining a second-stage reference beam region based on the first quality identifier and the second quality identifier.

In Example 102, the beam estimation method of example 100 or 101 is disclosed, wherein the first quality identifier and the second quality identifiers are received signal strength indicators.

In Example 103, the beam estimation method of example 100 or 101 is disclosed, wherein the first quality identifier and the second quality identifiers are Reference Signal Strength Indicators (RSSI).

In Example 104, the beam estimation method of example 100 or 101 is disclosed, wherein the first quality identifier and the second quality identifiers are Signal to Noise Ratio.

In Example 105, the beam estimation method of example 100 or 101 is disclosed, wherein the second-stage reference beam region comprises a region corresponding to the first quality identifier and a region corresponding to the second quality identifier.

In Example 106, the beam estimation method of example 105 is disclosed, wherein a gain of the second-stage reference beams is smaller than a gain of the first-stage reference beams.

In Example 107, the beam estimation method of example 100 or 101 is disclosed, further comprising allocating the second-stage reference beam region into a plurality of sectors, wherein the plurality of sectors for the second-stage reference beam region corresponds to a plurality of second-stage reference beams.

In Example 108, the beam estimation method of example 100 or 101 is disclosed, wherein the second-stage reference beam region further comprises a plurality of second-stage reference beams, and wherein a gain of the first-stage reference beams is greater than a gain of the second-stage reference beams.

In Example 109, the beam estimation method of example 100 or 101 is disclosed, further comprising defining a plurality of second-stage reference beam regions, at least two second-stage reference beam regions being non-adjacent, based at least on a distance between the first quality identifier and the second quality identifier.

In Example 110, the beam estimation method of example 100 or 101 is disclosed, further comprising determining the second stage reference with a beam estimation algorithm.

In Example 111, a Means of beam estimation is disclosed comprising:
one or more transceiving Means, configured to transmit a plurality of first-stage reference beams, and to receive a first quality identifier corresponding to a first first-stage reference beam with a strongest signal strength and a second quality identifier corresponding to a second first-stage reference beam with a second strongest signal strength; and
one or more processing means, configured to determine a second-stage reference beam region based on the first quality identifier and the second quality identifier.

In Example 112, a Means of beam estimation is disclosed comprising:
one or more transceiving Means, configured to receive a plurality of first-stage reference beams; and one or more processing Means, configured to determine a first quality identifier and a second quality identifier, wherein the first quality identifier identifies a first-stage reference beam with a greatest received signal quality and the second quality identifier identifies a first-stage reference beam with a second greatest signal quality; and to determine a second-stage reference beam region based on the first quality identifier and the second quality identifier.

In Example 113, the Means beam estimation of example 111 or 112 is disclosed, wherein the second-stage reference beam region comprises a region corresponding to the first quality identifier and a region corresponding to the second quality identifier.

In Example 114, a non-transient machine-readable storage including machine-readable instructions is disclosed, configured to: receive a plurality of first-stage reference beams; determine a first quality identifier and a second quality identifier, wherein the first quality identifier identifies a first-stage reference beam with a greatest received signal quality and the second quality identifier identifies a first-stage reference beam with a second greatest signal quality; and determine a second-stage reference beam region based on the first quality identifier and the second quality identifier.

While the Disclosure has been particularly shown and described with reference to specific embodiments, it should be understood by those skilled in the art that various changes in form and detail may be made therein without departing from the spirit and scope of the Disclosure as defined by the appended claims. The scope of the Disclosure is thus indicated by the appended claims and all changes which come within the meaning and range of equivalency of the claims are therefore intended to be embraced.

The invention claimed is:

1. A base station, comprising:
one or more transceivers; and
one or more processors, wherein the one or more processors are configured to cause the base station to:
transmit a plurality of first-stage reference beams;
receive a first quality identifier corresponding to a first first-stage reference beam with a strongest signal strength and a second quality identifier corresponding to a second first-stage reference beam with a second strongest signal strength; and
determine a second-stage reference beam region based on the first quality identifier and the second quality identifier.

2. The base station of claim 1,
wherein the one or more processors are further configured to cause the base station to:
store at least one of a first-stage reference beam identifier, the first quality identifier, the second-stage reference beam region, or a second-stage reference beam identifier.

3. The base station of claim 1,
wherein the first quality identifier and the second quality identifier include at least one of:
received signal strength indicators,
reference signal strength indicators (RSSIs); or signal to noise ratio.

4. The base station of claim 1,
wherein the second-stage reference beam region includes a region corresponding to the first quality identifier and a region corresponding to the second quality identifier.

5. The base station of claim 1,
wherein a gain of second-stage reference beams is smaller than a gain of the first-stage reference beams.

6. The base station of claim 1,
wherein the one or more processors are further configured to cause the base station to:
allocate the second-stage reference beam region into a plurality of sectors.

7. The base station of claim 6,
wherein the plurality of sectors for the second-stage reference beam region corresponds to a plurality of second-stage reference beams.

8. A user equipment (UE), comprising:
one or more transceivers; and
one or more processors, wherein the one or more processors are configured to cause the UE to:
receive a plurality of first-stage reference beams;
determine a first quality identifier and a second quality identifier, wherein the first quality identifier identifies a first-stage reference beam with a greatest received signal quality, and wherein the second quality identifier identifies a first-stage reference beam with a second greatest signal quality; and
determine a second-stage reference beam region based on the first quality identifier and the second quality identifier.

9. The UE of claim 8,
wherein the one or more processors are further configured to cause the UE to:
store at least one of a first-stage reference beam identifier, the first quality identifier, the second-stage reference beam region, or a second-stage reference beam identifier.

10. The UE of claim 8,
wherein the first quality identifier and the second quality identifier include at least one of:
received signal strength indicators;
reference signal strength indicators (RSSIs); or
signal to noise ratio.

11. The UE of claim 8,
wherein the second-stage reference beam region includes a region corresponding to the first quality identifier and a region corresponding to the second quality identifier.

12. The UE of claim 8,
wherein a gain of second-stage reference beams is smaller than a gain of the first-stage reference beams.

13. The UE of claim 8,
wherein the one or more processors are further configured to cause the UE to:
allocate the second-stage reference beam region into a plurality of sectors.

14. The UE of claim 13,
wherein the plurality of sectors for the second-stage reference beam region corresponds to a plurality of second-stage reference beams.

15. A non-transitory computer readable memory medium storing program instructions executable by processing circuitry to cause a user equipment (UE) to:
receive a plurality of first-stage reference beams;
determine a first quality identifier and a second quality identifier, wherein the first quality identifier identifies a first-stage reference beam with a greatest received signal quality, and wherein the second quality identifier identifies a first-stage reference beam with a second greatest signal quality; and determine a second-stage reference beam region based on the first quality identifier and the second quality identifier.

16. The non-transitory computer readable memory medium of claim 15,
wherein the program instructions are further executable to cause the UE to:
store at least one of a first-stage reference beam identifier, the first quality identifier, the second-stage reference beam region, or a second-stage reference beam identifier.

17. The non-transitory computer readable memory medium of claim 15,
wherein the first quality identifier and the second quality identifier include at least one of:
received signal strength indicators;
reference signal strength indicators (RSSIs); or signal to noise ratio.

18. The non-transitory computer readable memory medium of claim 15,
wherein the second-stage reference beam region includes a region corresponding to the first quality identifier and a region corresponding to the second quality identifier.

19. The non-transitory computer readable memory medium of claim 15,
wherein a gain of second-stage reference beams is smaller than a gain of the first-stage reference beams.

20. The non-transitory computer readable memory medium of claim 15,
wherein the program instructions are further executable to cause the UT to:
allocate the second-stage reference beam region into a plurality of sectors, wherein the plurality of sectors for the second-stage reference beam region corresponds to a plurality of second-stage reference beams.

\* \* \* \* \*